" id="10") Patent No.: US 9,430,245 B2
(45) Date of Patent: Aug. 30, 2016

(54) EFFICIENT BRANCH PREDICTOR HISTORY RECOVERY IN PIPELINED COMPUTER ARCHITECTURES EMPLOYING BRANCH PREDICTION AND BRANCH DELAY SLOTS OF VARIABLE SIZE

(71) Applicant: Telefonaktiebolaget L M Ericsson (publ), Stockholm (SE)

(72) Inventors: Erik Rijshouwer, Nuenen (NL); Ricky Nas, Eindhoven (NL)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 325 days.

(21) Appl. No.: 14/228,436

(22) Filed: Mar. 28, 2014

(65) Prior Publication Data

US 2015/0277926 A1 Oct. 1, 2015

(51) Int. Cl.
*G06F 9/00* (2006.01)
*G06F 9/44* (2006.01)
*G06F 9/38* (2006.01)
*G06F 9/30* (2006.01)

(52) U.S. Cl.
CPC ......... *G06F 9/3861* (2013.01); *G06F 9/30058* (2013.01); *G06F 9/3844* (2013.01); *G06F 9/3863* (2013.01); *G06F 9/3867* (2013.01)

(58) Field of Classification Search
None
See application file for complete search history.

(56) References Cited

U.S. PATENT DOCUMENTS

| | | |
|---|---|---|
| 5,724,563 A | 3/1998 | Hasegawa |
| 5,784,603 A | 7/1998 | Leung et al. |
| 5,864,697 A | 1/1999 | Shiell |
| 6,189,091 B1 | 2/2001 | Col et al. |
| 6,598,152 B1 | 7/2003 | Sinharoy |
| 6,622,240 B1 | 9/2003 | Olson et al. |
| 2003/0172259 A1 | 9/2003 | Mori et al. |

(Continued)

FOREIGN PATENT DOCUMENTS

| | | |
|---|---|---|
| EP | 0 355 069 A2 | 2/1990 |
| EP | 0 689 131 A1 | 12/1995 |

(Continued)

OTHER PUBLICATIONS

PCT International Search Report, mailed Jun. 17, 2015, in connection with International Application No. PCT/EP2015/055656, all pages.

(Continued)

*Primary Examiner* — Michael Sun
(74) *Attorney, Agent, or Firm* — Leffler Intellectual Property Law, PLLC; Kenneth B. Leffler

(57) ABSTRACT

A pipelined processor employs branch prediction based on branch source instructions situated in a last one of a variable number of branch delay slots associated with a branch instruction. As each memory unit of data (UoD) progresses through the processing stages from one cycle to a next, a set of N branch prediction histories is built that is associated with the UoD, N being the number of cycles the branch predictor requires to produce an output. A history of evaluated branch outcomes of branch instructions that reached the branch evaluation stage is also maintained. Recovery from misprediction includes using the history of evaluated branch outcomes and the set of branch prediction histories associated with the UoD (readily available to a last stage of the pipeline) as a source of recovery histories for inputting to a branch predictor when N next memory units of data are loaded into the pipeline.

11 Claims, 14 Drawing Sheets

(56) References Cited

U.S. PATENT DOCUMENTS

| | | | |
|---|---|---|---|
| 2003/0226003 A1 | 12/2003 | Tago et al. | |
| 2004/0003217 A1* | 1/2004 | Ukai | G06F 9/3806 712/239 |
| 2005/0125786 A1 | 6/2005 | Dai et al. | |
| 2005/0149710 A1* | 7/2005 | Hikichi | G06F 9/3806 712/240 |
| 2006/0184738 A1 | 8/2006 | Bridges et al. | |
| 2010/0050164 A1 | 2/2010 | Van De Waerdt et al. | |
| 2011/0264862 A1* | 10/2011 | Karlsson | G06F 9/3802 711/125 |

FOREIGN PATENT DOCUMENTS

| | | |
|---|---|---|
| WO | 99/54810 A1 | 10/1999 |
| WO | 2008/072178 A1 | 6/2008 |

OTHER PUBLICATIONS

Kevin Skadron et al., "Speculative Updates of Local and Global Branch History: A Quantitative Analysis", Jan. 1, 2000, retrieved from the Internet on Jun. 30, 2014.

Pleszkun A R et al., "WISQ: A Restartable Architecture Using Queues", Proceedings of the Annual International Symposium on Computer Architecture. Pittsburgh, Jun. 2-5, 1987; Washington, IEEE Comp. Soc. Press, US, vol. Symp. 14, Jun. 2, 1987, pp. 290-299.

"Migrating from MIPS to ARM, Application Note 235" ARMDAI0235C, 2010, pp. 1-22, ARM Limited, http://www.arm.com.

McFarling, Scott "Combining Branch Predictors, WRL Technical Note TN-36", Jun. 1993, pp. 1-25, Western Reserach Laboratory, Palo Alto, California.

PCT International Search Report, mailed May 11, 2015, in connection with International Application No. PCT/EP2015/051119, all pages.

Su, Ching-Long et al. "Branch with Masked Squashing in Superpipelined Processors" Proceedings of the 21st Annual International Symposium on Computer Architecture, pp. 130-140, 1994.

Office Action issued Mar. 28, 2016 in connection with U.S. Appl. No. 14/167,973, 41 pages.

* cited by examiner

| | Cycle 1 (prediction) | Cycle 2 | Cycle 3 | Cycle 4 | Cycle 5 (evaluation) | Cycle 6 |
|---|---|---|---|---|---|---|
| IF1 prediction: | Branch T -> Instr11 | Instr11 | Instr12 | Instr13 | Instr14 | Instr15 |
| IF2 | Instr5 | Branch | Instr11 | Instr12 | Instr13 | Instr14 |
| ID1 | Instr4 | Instr5 | Branch | Instr11 | Instr12 | Instr13 |
| ID2 | Instr3 | Instr4 | Instr5 | Branch | Instr11 | Instr12 |
| EXE | Instr2 | Instr3 | Instr4 | Instr5 | Branch | Instr11 |

| | Cycle 1 | Cycle 2 | Cycle 3 | Cycle 4 | Cycle 5 |
|---|---|---|---|---|---|
| IF1<br>pred_hist:<br>prediction: | 4: Bb(T -> 11)<br>(0xxx)<br>-- | 5: flushed<br>(00xx)<br>-- | 11: B(T -> 21)<br>(00xx)<br>-- | 12: b(T -> 21)<br>(100x)<br>-- | 13: flushed<br>(100x)<br>-- |
| IF2<br>pred_hist:<br>prediction: | 3: b(NT)<br>(0xxx)<br>NT | 4: Bb(T -> 11)<br>(0xxx)<br>T -> 11 | 5: flushed<br>(00xx)<br>-- | 11: B(T -> 21)<br>(00xx)<br>-- | 12: b(T -> 21)<br>(100x)<br>T -> 21 |
| ID1<br>pred_hist:<br>prediction: | 2:<br>(0xxx) | 3: b(NT)<br>(0xxx)<br>NT | 4: Bb(T -> 11)<br>(0xxx)<br>T -> 11 | 5: flushed<br>(00xx)<br>-- | 11: B(T -> 21)<br>(00xx)<br>-- |
| ID2<br>pred_hist:<br>prediction: | 1: B(NT)<br>(xxxx) | 2:<br>(0xxx) | 3: b(NT)<br>(0xxx)<br>NT | 4: Bb(T -> 11)<br>(0xxx)<br>T -> 11 | 5: flushed<br>(00xx)<br>-- |
| EXE<br>pred_hist:<br>prediction: | 0: b(NT)<br>(xxxx)<br>NT | 1: B(NT)<br>(xxxx) | 2:<br>(0xxx) | 3: b(NT)<br>(0xxx)<br>NT | 4: Bb(T -> 11)<br>(0xxx)<br>T -> 11 |

| | Cycle 1 | Cycle 2 | Cycle 3 | Cycle 4 | Cycle 5 |
|---|---|---|---|---|---|
| IF1<br>pred_hist:<br>prediction: | 4: Bb(T -> 11)<br>(0xxx)<br>-- | 5: flushed<br>(00xx)<br>-- | 11: B(T -> 21)<br>(0xxx)<br>-- | 12: b(T -> 21)<br>(10xx)<br>-- | 13: flushed<br>(10xx)<br>-- |
| IF2<br>pred_hist:<br>prediction: | 3: b(T -> 11)<br>(0xxx)<br>NT (!) | 4: flushed<br>(0xxx)<br>-- | 5: flushed<br>(00xx)<br>-- | 11: B(T -> 21)<br>(0xxx)<br>-- | 12: b(T -> 21)<br>(10xx)<br>T -> 21 |
| ID1<br>pred_hist:<br>prediction: | 2:<br>(0xxx) | 3: b(T -> 11)<br>(0xxx)<br>NT (!) | 4: flushed<br>(0xxx)<br>-- | 5: flushed<br>(00xx)<br>-- | 11: B(T -> 21)<br>(0xxx)<br>-- |
| ID2<br>pred_hist:<br>prediction: | 1: B(T -> 11)<br>(xxxx) | 2:<br>(0xxx) | 3: b(T -> 11)<br>(0xxx)<br>NT (!) | 4: flushed<br>(0xxx)<br>-- | 5: flushed<br>(00xx)<br>-- |
| EXE<br>pred_hist:<br>prediction: | 0: b(NT)<br>(xxxx)<br>NT | 1: B(T -> 11)<br>(xxxx)<br>-- | 2:<br>(0xxx) | 3: b(T -> 11)<br>(0xxx)<br>NT (!) | 4: flushed<br>(0xxx)<br>-- |

FIG. 5

|  | Cycle 1 | Cycle 2 | Cycle 3 |
|---|---|---|---|
| IF1<br>pred_hist:<br>next_hist<br>prediction: | ~~8: flushed~~<br>~~(0xxx)~~<br>~~(10xx)~~<br>-- | ~~9: flushed~~<br>~~(0xxx)~~<br>~~(10xx)~~<br>-- | ~~12: flushed~~<br>~~(10xx)~~<br>~~(10xx)~~<br>-- |
| IF2<br>pred_hist:<br>next_hist<br>prediction: | 6: b(NT)<br>(xxxx)<br>(0xxx)<br>T -> 11 (!) | ~~8: flushed~~<br>~~(0xxx)~~<br>~~(10xx)~~<br>-- | ~~11: flushed~~<br>--<br>--<br>-- |
| ID1<br>pred_hist:<br>next_hist<br>prediction: | ~~7: flushed~~<br>~~(xxxx)~~<br>~~(0xxx)~~<br>-- | 6: b(NT)<br>(xxxx)<br>(0xxx)<br>T -> 11 (!) | ~~9: flushed~~<br>~~(0xxx)~~<br>~~(10xx)~~<br>-- |
| ID2<br>pred_hist:<br>next_hist<br>prediction: | 5: B(NT)<br>(xxxx)<br>(xxxx) | 4: b(NT)<br>(xxxx)<br>(xxxx)<br>NT | ~~7: flushed~~<br>~~(xxxx)~~<br>~~(0xxx)~~<br>-- |
| EXE<br>pred_hist:<br>next_hist<br>prediction: | 3:<br>(xxxx)<br>(xxxx) | 5: B(NT)<br>(xxxx)<br>(xxxx) | 6: b(NT)<br>(xxxx)<br>(0xxx)<br>T -> 11 (!) |
|  | 1:<br>(xxxx)<br>(xxxx) | 3:<br>(xxxx)<br>(xxxx) | 4: b(NT)<br>(xxxx)<br>(xxxx)<br>NT |
|  | 0: B(NT)<br>(xxxx)<br>(xxxx)<br>NT | 2:<br>(xxxx)<br>(xxxx) | 5: B(NT)<br>(xxxx)<br>(xxxx) |
| commit_hist | (xxxx) | (0xxx) | (0xxx) |

| | Cycle 4 | | | Cycle 5 | | | Cycle 6 | | |
|---|---|---|---|---|---|---|---|---|---|
| IF1 pred_hist: next_hist: prediction: | -- -- -- -- | 7: Bb(NT) (xxxx) (0xxx) -- | | 8: (0xxx) (00xx) -- | 9: (0xxx) (00xx) -- | | 10: (00xx) (00xx) -- | 11: (00xx) (00xx) -- | |
| IF2 pred_hist: next_hist: prediction: | ~~12: flushed~~ ~~(10xx)~~ ~~(10xx)~~ -- | ~~13: flushed~~ ~~(10xx)~~ ~~(10xx)~~ -- | | ~~12: flushed~~ ~~(10xx)~~ ~~(10xx)~~ -- | 7: Bb(NT) (xxxx) (0xxx) NT | | | 9: (0xxx) (00xx) -- | |
| ID1 pred_hist: next_hist: prediction: | flushed -- -- -- | ~~14: flushed~~ ~~(0xxx)~~ ~~(10xx)~~ -- | | ~~13: flushed~~ ~~(10xx)~~ ~~(10xx)~~ -- | ~~13: flushed~~ ~~(10xx)~~ ~~(10xx)~~ -- | | | 7: Bb(NT) (xxxx) (0xxx) NT | |
| ID2 pred_hist: next_hist: prediction: | ~~8: flushed~~ ~~(0xxx)~~ ~~(10xx)~~ -- | 9: flushed ~~(0xxx)~~ ~~(10xx)~~ -- | | flushed -- -- -- | ~~14: flushed~~ ~~(0xxx)~~ ~~(10xx)~~ -- | | ~~12: flushed~~ ~~(10xx)~~ ~~(10xx)~~ -- | ~~13: flushed~~ ~~(10xx)~~ ~~(10xx)~~ -- | |
| EXE pred_hist: next_hist: prediction: | 6: b(NT) (xxxx) (0xxx) T -> 11(!) | ~~7: flushed~~ ~~(xxxx)~~ ~~(0xxx)~~ -- | | ~~8: flushed~~ ~~(0xxx)~~ ~~(10xx)~~ -- | 9: flushed ~~(0xxx)~~ ~~(10xx)~~ -- | | flushed -- -- -- | ~~11: flushed~~ ~~(0xxx)~~ ~~(10xx)~~ -- | |
| commit_hist | (00xx) | (00xx) | | (00xx) | (00xx) | | (00xx) | (00xx) | |

Select each one of N recovery histories from the history of evaluated branch outcomes and the set of branch prediction histories Compute distance representing how many memory unit of data boundaries exist between the branch instruction and the branch source of the branch instruction — 915

911

Select each of N values from evaluated branch outcomes and set of branch prediction histories associated with the memory unit of data, selection being a function of parameters (computed distance, location of branch source within memory unit of data, ...) — 917

Supply respective ones of the N selected recovery histories as input to the branch predictor when each one of N next memory units of data are loaded into the prediction start stage of the pipeline — 913

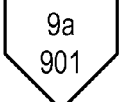

EFFICIENT BRANCH PREDICTOR HISTORY RECOVERY IN PIPELINED COMPUTER ARCHITECTURES EMPLOYING BRANCH PREDICTION AND BRANCH DELAY SLOTS OF VARIABLE SIZE

BACKGROUND

The invention relates to pipelined computer architectures, and more particularly to recovery of branch predictor history in pipelined computer architectures employing branch prediction and branch delay slots of variable size.

Programmable computers comprise processing circuitry and some sort of storage mechanism ("memory") for storing data and program instructions. In their simplest form, computers operate on a principle in which an instruction is fetched from memory and the processor executes (i.e., performs) the instruction. Execution of instructions may involve fetching one or more data operands from memory and/or register locations, producing some sort of data based on the fetched data, and then storing the result into a memory and/or register location.

A key characteristic of programmable processors is the ability for the processor itself to select which one of a number of sets of instructions will be executed based on the present state of one or more conditions. To take a very simple example, if a particular data item has a value of zero, the program designer may intend for one set of instructions to be performed, whereas if the particular data item has a nonzero value, the program designer may intend for a different set of instructions to be performed. The tested data item may have different values at different times during program execution, so the performance of the program may change over time.

To enable this type of functionality, instructions are by default designed to be executed in sequence. Each storage location in memory is associated with an address (essentially, a number), and instructions that are intended to be unconditionally executed in sequence are stored in memory locations having sequentially increasing addresses. The processor might, for example start operating by fetching and then executing the instruction located at memory address 0, followed by fetching and then executing the instruction located at memory address 1, and so on.

In order to change the flow of program execution, branch instructions are introduced. Typically the fetching of a branch instruction causes the processor to test whatever condition(s) is specified by the instruction. If the test outcome is that the condition is not satisfied, then the next instruction is fetched from the memory location that immediately follows the location at which the branch instruction is stored. However, if the test outcome is that the condition is satisfied, then instead of fetching the instruction that immediately follows the branch instruction, an instruction fetch is performed from a non-sequential memory address whose value is in some way specified by the branch instruction.

Pipelines

Through the years, computer engineers have come up with many ways of enabling computers to execute more instructions in less time. Of course, one way is simply to reduce the amount of time it takes to fetch instructions and execute them. Another way is to introduce parallelism into the architecture; that is, to allow different aspects of processing to take place concurrently. One type of architecture that exploits parallelism is a so-called pipelined architecture, in which each instruction is executed in a sequence of stages.

As one instruction moves from one stage in the pipeline to the next, another instruction takes its place. When each of the stages has an instruction in it, and with the stages operating in parallel, the amount of time it takes to execute one instruction is effectively the amount of time it spends in one of the stages because, when each stage of a pipeline has a different instruction in it, a new execution result is produced at the end of the pipeline every time an instruction is shifted from one stage to the next.

More particularly an instruction pipeline splits up each instruction into a sequence of dependent steps. Consider an exemplary pipelined processor consisting of the following stages:

Stage 1: Instruction fetch (IF1)
Stage 2: Instruction fetch (IF2)
Stage 3: Instruction decode and register fetch (ID1)
Stage 4: Instruction decode and register fetch (ID2)
Stage 5: Execute (EXE)

One consequence of splitting up instruction processing in this manner is that the effect of an instruction will not been reflected in the architectural state (i.e., performance of the instruction is not yet completed) before the next instruction is fetched. The number of cycles in an unstalled pipeline between the fetching of the instruction and its execution is referred to as the pipeline latency.

If the correct execution of an instruction depends on the result of a previous not yet completed instruction, a pipeline hazard occurs. Hazards can be avoided in both software (by properly re-scheduling instructions) and hardware (by stalling or forwarding).

Branches

Program code is rarely linear and thus, as explained earlier, contains jumps (branches) from one position in the code (branch source) to another position (branch target). Also as explained above, branches can be conditional: the branch is taken when the condition holds, otherwise it is not taken. The branch target and branch condition can be data dependent or data independent. These potential dependencies put constraints on the scheduling freedom of branches.

A branch target can only be fetched once it is known (i.e. the branch has been executed, at which time the branch condition is resolved and the branch target address computed).

The instructions to be executed following execution of the branch (i.e., the target instructions) are dependent on the correct execution of that branch. This means that the fetching of the target instructions to be executed following the branch can only reliably start after the branch has been executed.

FIG. 1a illustrates a code segment that includes a branch instruction. In this example, instructions (Instr) are numbered sequentially. A branch instruction has been placed just after Instr6. In this document, with respect to branches, the following notation is used:

"(NT)" means that a branch execution will result in the branch not being taken (i.e., the next sequentially occurring instruction following the branch will be executed)

"(T)→Instr#" means that the branch condition has been satisfied so that a branch will be taken, and that the target is Instr# (where "#" represents an instruction number)

It can therefore be seen that, in the Example of FIG. 1a, the illustrated branch instruction has target 101 if the branch is not taken (NT), and target 103 if the branch is taken (T). In this example, branch execution results in the branch being taken, with the target instruction being Instr11. This means that the NT target instructions 101 will not be executed.

FIG. 1b is a processing sequence diagram 150 that illustrates how the branch instruction of FIG. 1a would be processed in the exemplary pipelined processor mentioned above. Each rectangle shows what instruction is contained in a given stage (IF1, IF2, ID1, ID2, EXE) of the pipeline. Time proceeds from left to right in the figure, and is denoted in terms of cycle number.

The example starts in Cycle 0, at which point the contents of stages EXE, ID2, ID1, IF2, and IF1 are Instr6, Branch, Instr7, Instr8, and Instr9 respectively. It will be understood that instructions Instr7, Instr8, and Instr9 have been fetched under the assumption that instructions should be fetched from sequential memory addresses unless an executed Branch instruction requires a different action.

In Cycle 1, Instr6 is no longer in the pipeline and each of the remaining instructions has advanced one stage in the pipeline. Although not shown in the Figure, the next sequential instruction, Instr10, has been fetched and loaded into the first stage of the pipeline (i.e., the IF1 stage). The Branch instruction has reached the EXE stage of the pipeline and the contents of stages ID2, ID1, IF2, and IF1 are Instr 7, Instr8, Instr9, and Instr10, respectively.

However, as mentioned above, in this example the branch is to be taken, with the target being Instr11. The pipelined execution of the taken branch in the EXE stage during Cycle 1 means that the already fetched and partially-processed instructions contained in the earlier stages of the pipeline (i.e., stages IF1, IF2, ID1, and ID2) are the NT target instructions 101, and these should not be allowed to change the state of the computer. For this reason, the exemplary pipelined processor is configured not to execute (and thereby not to change the state of the processor) when each of these already fetched instructions reaches the EXE stage of the pipeline. This type of non-execution is called an "idle cycle". In the example of FIG. 1b, it can be seen that the branch instruction in cycle 1 causes the next four cycles to be idle cycles in the EXE stage, with the next instruction to be executed (Instr 11) not reaching the EXE stage until Cycle 6.

This means that 4 cycles of processor time are essentially wasted, which is an undesirable effect. There are two commonly used ways to prevent the functional units of a processor from becoming idle due to the pipeline having to wait for the execution of the branch: branch delay slots and branch prediction. These are discussed in the following:

Branch Delay Slots

One way of reducing the number of idle cycles associated with a branch taken condition in a pipelined processor is to position the branch instruction within the set of instructions such that the sequentially next instructions immediately following branch instruction are instructions that need to be executed regardless of whether the outcome of branch execution is "taken" or "not taken". This technique is illustrated in FIG. 2. Three similar program segments are shown: "Original program" 250; "Branch with 4 branch delay slots filled" 260; and "Branch with 2 of 4 branch delay slots filled" 270. For each of these, it is assumed that the program is executed by a 5-stage pipelined processor as discussed earlier. For each of the examples, instructions Instr6 through Instr10 are the target instructions if the branch is not taken 201, and the instructions starting with Instr11 are the target instructions if the branch is taken 203.

The Original program 250 is very much like the one shown in FIG. 1a: the illustrated portion begins with five instructions (Instr1, . . . , Instr5) followed by a conditional branch instruction. Following the conditional branch instruction, another seven instructions are depicted (Instr6, . . . , Instr12). In this example, the condition tested by the branch instruction is satisfied, so the branch will be taken, with the target starting at Instr11 (i.e., instructions Instr6 through Instr10 are not to be executed). When this program segment is executed in the pipelined processor, the effect is as shown in FIG. 1b: there will be four idle cycles before the target instruction, Instr11, is executed.

It will be observed that if the compiler were to advance the placement of the branch by 4 instructions, as depicted in the example called "Branch with 4 branch delay slots filled" 260, the pipeline latency would be completely hidden for this branch. This is because when the branch instruction is in the EXE stage of the pipeline, the remaining four stages of the pipeline will be working on instructions Instr2 through Instr5 which, according to the Original program 250, are required to be executed regardless of the outcome of the branch.

When this technique is used, the instruction positions that fill the pipeline stages when the branch instruction is in the EXE stage of the pipeline are called "branch delay slots". This technique of repositioning the branch instruction to an earlier position within the program code separates the location that the branch instruction occupies in the program code from the branch source (i.e., the position in the code from which execution jumps to another location based on the outcome of the branch instruction). That is, the last branch delay slot is now the branch source.

Thus, branch delay slots are scheduling slots for instructions representing the pipeline latency of their associated branch. The number of branch delay slots is therefore conventionally fixed and equal to roughly the pipeline depth. The branch delay slots are positioned directly after the branch instruction and are always executed, irrespective of the outcome of the branch instruction.

The branch delay slot strategy is not perfect, however, because branches can only be advanced up to the slot immediately following the last instruction that determines the branch behavior. If, in the Original program 250 shown in FIG. 2, execution of the instruction "Instr3" determines the branch behavior (i.e., the state that will be tested in the branch condition), the branch cannot be advanced any earlier than "Instr3" because it would be evaluating the state of a condition that had not yet been determined. In this case, only instructions "Instr4" and "Instr5" can be used to fill the branch delay slots, leaving two unfilled branch delay slots. The unfilled branch delay slots will contain so-called NOPs ("No Operation" instructions—instructions that do not change the state of the computer). This is illustrated in the program segment called "Branch with 2 of 4 branch delay slots filled" 270. Every NOP will lead to an idle functional unit and thus to performance loss.

Branch Prediction

Another way to mitigate the performance loss due to pipeline latency when a branch is performed is to predict the outcome of a branch in advance of the branch's actual time of execution. Ideally, for the exemplary pipelined processor, the target of a branch would be predicted when the branch source is in the IF1 stage. This would allow the branch target to be fetched during the next cycle, and no performance loss would occur.

The prediction of branches is done by a specialized unit: the branch prediction unit (BPU). A BPU contains memories to keep track of the branch information that becomes available once a branch has been executed. When a branch is fetched, the BPU's internal algorithms predict the branch information (what the target instruction is, whether the branch will be taken (i.e., "branch direction", etc.) based on historical and/or contextual information with respect to this branch. Branch prediction techniques are described in, for example, Scott McFarling, "Combining Branch Predictors", WRL Technical Note TN-36, June 1993, pp. 1-25, Digital Western Research Laboratory, Palo Alto, Calif., USA.

Having predicted the target and direction of the branch in IF1, the predicted target is fetched in the very next cycle, so that there need not be any idle cycles regardless of branch outcome if the prediction is correct. FIG. 3 is a processing sequence diagram 300 that illustrates the performance improvement that can be achieved when branch target and direction can be correctly predicted. Using the same exemplary code segment shown as "Original program" in FIG. 2 and an exemplary 5-stage pipelined processor with branch prediction, the processing sequence diagram 300 shows the pipeline in Cycle 1, at which point instructions Instr2, Instr3, instr4 and Instr5 are in pipeline stages EXE, ID2, ID1, and IF2, respectively. Further, the branch instruction has just been loaded into pipeline stage IF1.

In this example, the prediction made in the IF1 stage is that the branch will be "taken", and the target is Instr11 (denoted in the figure as "T→Instr11"). Accordingly, in Cycle 2, the predicted target instruction (Instr11) is fetched and loaded into the IF1 stage when the instructions in each of the other stages advance one stage in the pipeline. Since there are no other branch instructions in this example, instructions are fetched from sequential memory locations in each of cycles 3, 4, 5, and 6.

The actual evaluation of the branch instruction takes place when the branch instruction reaches the EXE stage in Cycle 5. Assuming that the prediction was correct (i.e., that the branch is taken with Instr11 being the target), the target instruction reaches the EXE stage in the very next cycle (Cycle 6). In this manner, the need for idle cycles has been avoided.

It is noted that technology has not yet advanced to the point at which it is always possible to make perfect branch predictions. For this reason, pipelined architectures continue to suffer from idle cycles even when branch prediction technology is employed.

The inventors have determined that each of the conventional techniques for dealing with idle cycles that result from execution of conditional branch instructions in a pipelined processor falls short in a number of aspects. In response to their recognizing the need for improved technology for avoiding the occurrence of idle cycles, the inventors have developed improved pipelined processor technology that employs, in combination, branch prediction and branch delay slots, the number of which (i.e., "size") can vary from one branch to the next. This technology is fully described in copending U.S. application Ser. No. 14/167,973 by Erik Rijshouwer and Ricky Nas entitled "Efficient Use of Branch Delay Slots and Branch Prediction in Pipelined Computer Architectures" and filed on Jan. 29, 2014.

One aspect of that technology relates to the inventors' recognition that conventional branch prediction technology is deficient because it has the BPU's internal algorithms predicting the branch information (what the target instruction is, whether the branch will be taken (i.e., "branch direction", etc.)) based on historical and/or contextual information (e.g., branch history, instruction address, etc.) with respect to a branch when the branch instruction reaches a particular one of the stages (e.g., in the example of FIG. 3, branch predictions are made by the first stage, i.e., the IF1 stage, but in other embodiments predictions can be made in any of the other stages, such as in the second stage, IF2). This strategy is fine when branch prediction is used alone, but when combined with branch delay slots, there may be more instructions that will be executed following the branch instructions regardless of branch outcome (i.e., instructions filling the branch instructions' associated branch delay slots), and these additional instructions can generate more state information that can be used to make predictions more accurate.

When one adds to this mix the aspect in which the number of branch delay slots following the branch can vary from one branch instruction to the next, the situation is made even more complicated at least because the branch history and instruction address information that is at least partly used by the predictor can be in any of the pipeline stages at any given moment. The inventors have nonetheless devised technology that is capable of making use of this additional information. An aspect of this technology involves making a branch prediction from the information available when a last branch delay slot instruction reaches a particular one of the pipeline stages, hereinafter referred to as the "prediction start stage".

Although the inventors' strategy described in the aforementioned copending application yields improvements over conventional technology, the inventors have themselves further recognized that additional improvements are desired, particularly when the pipeline includes instructions that were fetched as a result of an incorrect prediction. Improved technology that addresses these additional issues is therefore desired.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof. Also, as used herein the term "exemplary" means serving as one illustration out of any number of possible illustrations.

It is also emphasized that, as used herein, the term "unit of data" is intended to be a generic term that defines an amount of data that is retrieved from one memory storage location when a read operation is performed. Those of ordinary skill in the art will understand that the size of a "unit of data" in one embodiment can be different from the size of a unit of data in another embodiment.

In accordance with one aspect of the present invention, the foregoing and other objects are achieved in methods and apparatuses for controlling a pipelined processor having a plurality of serially connected processing stages including a first stage and a branch evaluation stage, wherein one of the processing stages other than the branch evaluation stage is a prediction start stage that supplies information for making branch predictions. The pipelined processor is operatively coupled to a memory that comprises a plurality of addressable storage locations, each storage location being for storing one unit of data. The pipelined processor executes instructions from an instruction set that includes a branch instruction and each branch instruction is associated with a set of branch delay slots whose size can be greater than or equal to zero and whose size can be different from one instance of a branch instruction to another. A last one of the branch delay slots is a branch source of the associated branch instruction.

Controlling such a pipelined processor includes, in a first processing cycle, supplying a first branch prediction history as input to a branch predictor that requires N cycles to produce an output. In an $N^{th}$ processing cycle after the first processing cycle, a memory unit of data is loaded into the first stage of the pipelined processor, wherein the memory unit of data includes a branch instruction. As the memory unit of data progresses through the processing stages from one cycle to a next, a set of N branch prediction histories is built that is associated with the memory unit of data, wherein the N branch prediction histories comprise the first branch prediction history and N−1 branch prediction histories used to predict N−1 subsequently fetched memory units of data.

A history of evaluated branch outcomes of branch instructions that reached the branch evaluation stage is maintained.

Control further comprises detecting, based on a present evaluation of the branch instruction included in the memory unit of data and an earlier predicted outcome, whether a branch misprediction occurred. In response to a detection that the branch misprediction occurred, values of each one of N recovery histories are selected from the history of evaluated branch outcomes and the set of branch prediction histories. Respective ones of the N selected recovery histories are supplied as input to the branch predictor when each one of N next memory units of data are loaded into the prediction start stage of the pipeline.

In some but not necessarily all embodiments, selecting values of each one of the N recovery histories from the history of evaluated branch outcomes and the set of branch prediction histories comprises computing a distance that represents how many memory unit of data boundaries exist between the branch instruction and the branch source of the branch instruction. Values of the N recovery histories are selected from the history of evaluated branch outcomes and the set of branch prediction histories that are associated with the memory unit of data as a function of a set of parameters, wherein the set of parameters comprises the computed distance. In some but not necessarily all such embodiments, the set of parameters comprises a detection of whether the branch source of the branch instruction is a last instruction in the memory unit of data. In some but not necessarily all such embodiments, the set of parameters comprises a detection of whether the present evaluation of the branch instruction is a branch taken outcome.

In some but not necessarily all embodiments, N equals 2.

BRIEF DESCRIPTION OF THE DRAWINGS

The objects and advantages of the invention will be understood by reading the following detailed description in conjunction with the drawings in which:

FIG. 3 is a processing sequence diagram that illustrates the performance improvement that can be achieved when branch target and direction can be correctly predicted in a pipelined processor.

FIG. 4 is a processing sequence diagram that illustrates a first set of exemplary pipelined processor operations, including maintenance of a branch prediction history, pred_hist.

FIG. 5 is a processing sequence diagram that illustrates the effect of an incorrect prediction on pipelined processor operations, including its effect on maintenance of the branch prediction history, pred_hist.

FIGS. 6a and 6b together constitute a processing sequence diagram that illustrates the effect of an incorrect prediction on pipelined processor operations when each unit of data fetched from program memory can contain two instructions, including the effect of an incorrect prediction on maintenance of the branch prediction history, pred_hist.

FIGS. 9a and 9b together are, in one respect, a flow chart of steps/processes performed by circuitry in accordance with some but not necessarily all exemplary embodiments of the invention for the purpose of recovering instructions and branch histories in a pipelined processor after a pipeline flush caused by branch misprediction.

DETAILED DESCRIPTION

Figure 1:
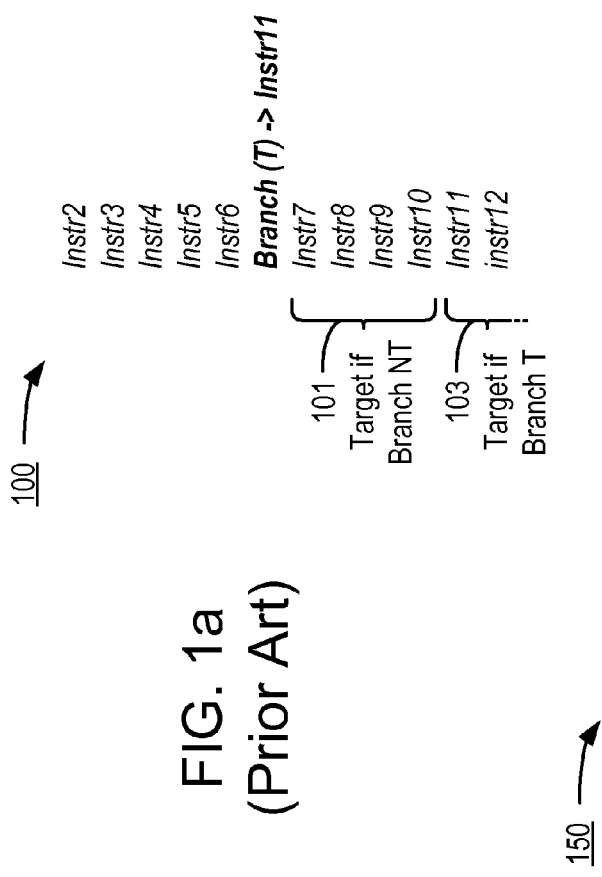
FIG. 1a illustrates a code segment that includes a branch instruction.
FIG. 1b is a processing sequence diagram that illustrates how the branch instruction of FIG. 1a would be processed in an exemplary pipelined processor.
Figure 2:
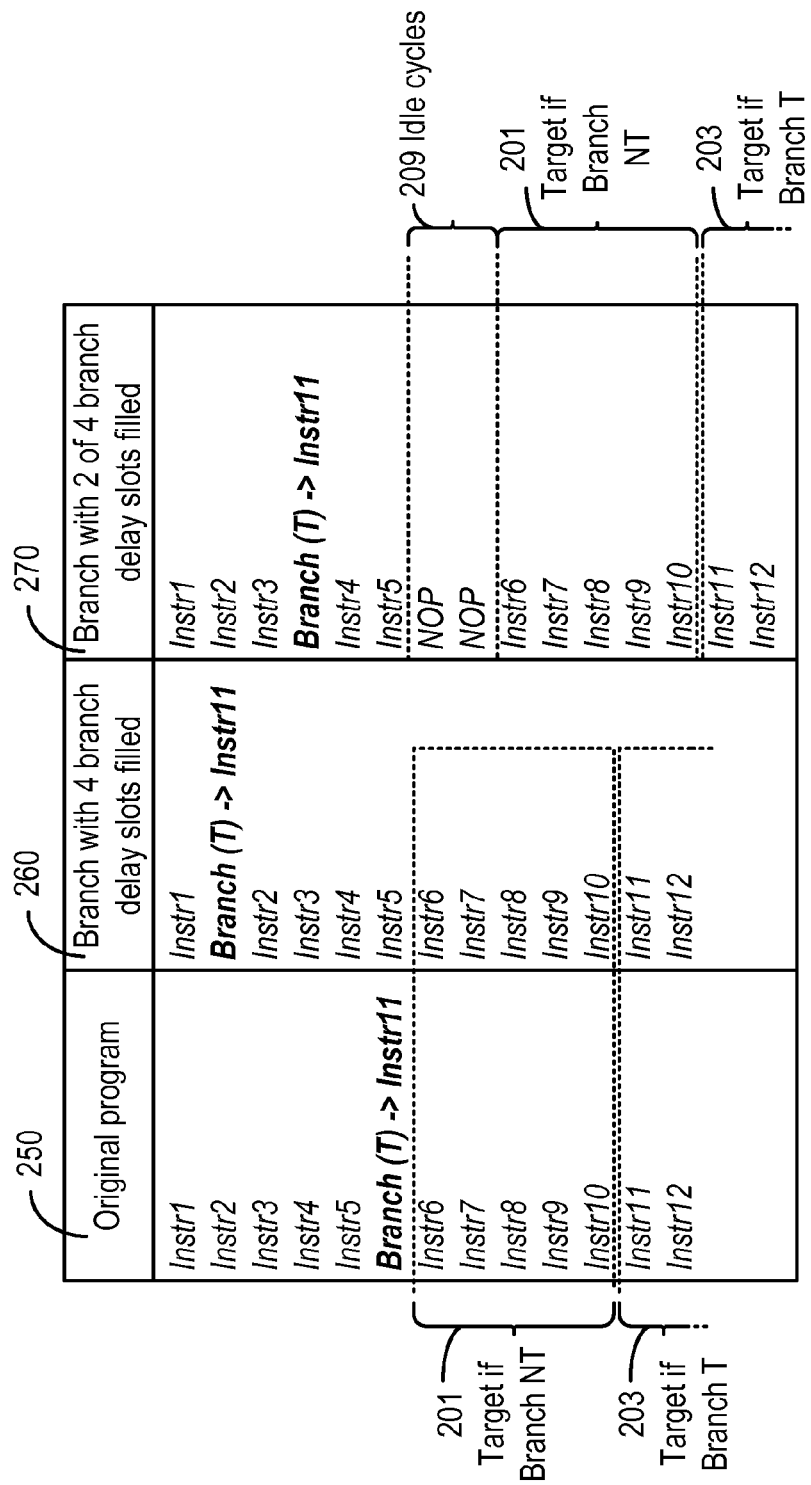
FIG. 2 illustrates code segments to which a branch delay slot strategy has been applied.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

As mentioned in the Background section, the inventors have described (i.e., in copending U.S. application Ser. No. 14/167,973) a pipelined computer architecture that employs, in combination, branch delay slots whose number ("size")

can vary from one branch instance to the next (including, in some instances, zero branch delay slots) and branch prediction technology in which predictions are based on information obtained from the branch source which, in these embodiments, is the instruction located in a last branch delay slot associated with the branch instruction. Also as mentioned earlier, these predictions are made available when the instruction in the last branch delay slot reaches a designated one of the processor stages called a "predictor stage".

It was noted that, in such embodiments, the branch history and instruction address information that are at least partly used by the branch prediction unit are not in a static location but are carried along with the instruction as it works its way through the pipeline. Consequently, that branch history information and instruction address can be in any of the pipeline stages at any given cycle. This can lead to less than desirable arrangements for pipeline control, particularly when the pipeline includes instructions that were fetched as a result of an incorrect prediction. The following describes this in more detail.

Branch prediction algorithms for modern pipelined processors make use of a global branch direction history to exploit correlations among different branches. Making use of these correlations can improve branch prediction substantially. The various embodiments described herein are suitable for use with many different known branch prediction algorithms. One well-known algorithm making use of a global branch direction history is "gshare" as described in the McFarling article cited earlier.

In the exemplary embodiments described in this document, it is assumed that the type of branch predictor employed is capable of producing three different types of outputs:

1. Whether a given instruction is a branch source (i.e., whether the instruction is occupies an end of branch delay slots position). If the answer is "no", then no further output is produced. However, if the answer is "yes", then the following output is also produced:
2. The branch direction ("taken" or "not taken") that will result from evaluation of the branch instruction associated with the branch source. If the prediction outcome indicates a "taken" branch, then the following output is also produced:
3. The target address of the taken branch. It will be understood that, when a branch is predicted to be "not taken", the next fetch should always be made from the next sequential memory unit of data.

Use of this type of branch predictor is not an essential aspect of the invention; the various aspects of described embodiments are also applicable to embodiments in which, for example, the predictor does not need to predict whether to make branch direction and target address predictions. Whether to make the prediction can be indicated by other sources.

However, when branch predictors of the type described above are employed, it will be understood that mispredictions can occur not only with respect to branch direction and target address, but also with respect to whether an instruction is a branch source (i.e., whether a branch prediction should be made). Such prediction failures can be in either of two ways:

the branch predictor may fail to predict that a location in the unit of data marks the end of the branch delay slots of a branch instruction when it really is, in which case no branch direction or target address will be produced—instruction fetching will continue from the next sequential memory address.

the branch predictor may incorrectly predict that a location in the unit of data does mark the end of the branch delay slots of a branch instruction when it in fact does not, in which case branch direction and possibly also target address will be predicted when correct operation requires that the next instruction fetch be made from the sequentially next memory address.

When such a predictor is employed, one can take the view that, in effect, all instructions are predicted because decisions to merely keep fetching instructions from sequential memory locations are, themselves, decisions.

To simplify the following discussion, the type of mispredictions illustrated all involve the predictor making a wrong prediction with respect to branch direction. However, the reader is advised that the other two types of predictor outputs can also be mispredicted, and that the technology described herein is applicable in those instances as well.

History Administration

Maintaining the global branch direction history (referred to as "history") in good order can be fairly complex. Every time the branch predictor predicts a branch, an indicator of the predicted branch outcome is added to the history and the oldest branch direction in the history is discarded. For example, a single bit '0' can be used to represent a "branch not taken" outcome, and a '1' can be used to indicate a 'branch taken' outcome. Adding the new prediction to the history can be performed by, for example, shifting the prediction (i.e., '0' or '1') into one end (e.g., the most significant bit) of a register or other storage location that contains the last set of prediction indicators. This new history is used to make the next prediction.

Two things should be understood: The predictor is, first of all, deciding ("predicting") whether an instruction is a branch source (i.e., an instruction residing in a last branch delay slot of an associated branch instruction). The predictor is also, when possible, predicting the outcome of the associated branch instruction.

Now assume a pipeline with a branch predictor that begins predicting an instruction's type and outcome when the instruction is loaded into the first stage of the pipeline, and that has a predictor processing delay of 2 cycles, so that the predictor delivers its prediction in the second stage of the pipeline. Also assume that each unit of data fetched from the program memory represents a single instruction. Using the exemplary pipeline stages described in the Background section, this would mean that the prediction for an instruction is made available when that instruction is in the IF2 stage. It can be seen that, by the time the prediction is made available, the pipeline has already fetched and loaded another instruction into the IF1 stage. (As mentioned above, the predictor will begin making a prediction for this newly fetched instruction immediately. Predictor processing takes, in this example, two cycles so that the outcome of prediction processing is not made available until the end of the next cycle.) This implies that the branch prediction processing that has started for the instruction in IF1 cannot utilize the history updated with the prediction supplied in IF2 because the start of prediction for the IF1 instruction and the completion of the prediction for the IF2 instruction occur during the same cycle. This means that the history used by the predictor when processing the instruction loaded in IF1 does not take into account the prediction made for the immediately preceding instruction, but is instead based on the one before that (i.e., it is the history that existed before the IF2 prediction has been considered).

This arrangement gives rise to a disparity in how branch history is capable of being administered. For example, assume that a prediction delivered for the IF2 stage is correct. If the predicted branch is taken, the instruction in IF1, which is the next sequential instruction following the instruction in the IF2 stage, was incorrectly fetched and has to be flushed. ("Flushing" an instruction means that it will be treated as a "No Operation"—"NOP"—instruction as it works its way through the remaining pipeline stages.) In place of the flushed instruction will be one that is newly fetched into IF1. This extra time to fetch the replacement instruction gives the predictor the opportunity to make a prediction for the next instruction in IF1 using an updated history that includes the prediction just made for the instruction in IF2. In other words, assuming that a correct prediction has been made, the next validly fetched instruction after the instruction in the IF2 stage can take advantage of the most recent prediction outcome; there need not be any delay in using the prediction.

However, if the predicted branch is not taken, so that the instruction following the one in the IF2 stage should rightly be the next sequential instruction in the program, the instruction already loaded in the IF1 stage is the correct one and will not be flushed. This means that the earlier discussed history update delay of one cycle will prevail, and the predictor will not be able to use the latest information when making a prediction for this IF1 stage instruction.

To simplify the history update mechanism in view of this disparity in possible outcomes (dependent on prediction outcome), exemplary embodiments described herein always delay updating the history used for predictions by one unit of data (i.e., the amount of data supplied by the program memory when a fetch is performed). That is, the prediction outcome in a present cycle does not become part of the maintained prediction history until it is associated with the next unit of data to be fetched (keeping in mind that the instruction in the IF1 stage has already been fetched, so that it is, in a sense, "skipped over").

The discussion so far has focused on the fact that incorrect branch predictions can result in one or more incorrectly fetched instructions being flushed from the processor pipeline, which results in wasted execution cycles (i.e., the flushed instructions are treated as NOPs when they reach the final, EXE stage of the pipeline, so no useful work is performed). However, another detrimental aspect of an incorrect branch prediction is that it produces an incorrect branch prediction history. This, of course, seriously affects the quality of branch predictions that rely on that incorrect history.

In order to ensure prediction accuracy, the history used by the predictor to continue predicting branches after an incorrect prediction has been made must be identical to the history that the predictor would have used had the prediction been correct. This means that to continue with branch prediction the last correct version of the history is required.

All history information is communicated through the pipeline (i.e., it is effectively shifted through the pipeline along with the instruction that served as the context source for making the prediction). When an instruction enters the IF1 stage, the history value of that moment is captured and kept with the instruction data. The captured history is the same history that served as a basis for the branch prediction that resulted in fetching the instruction in the IF1 stage, and is referred to herein as "pred_hist". For example, suppose the prediction history is four bits long, and that the value of pred_hist for the instruction in the IF1 stage is "0xxx" (where 'x' represents a don't care bit bit). This means that the last prediction having an effect on the pred_hist for the instruction in the IF1 stage was a prediction equal to "not taken". This prediction was made some number of fetches earlier, the number being greater than 1 because of the delay in updating prediction history. Similarly, if the value of pred_hist for the instruction in the IF1 stage is "1xxx" this means that the last prediction having an effect on the pred_hist for the instruction in the IF1 stage was a prediction equal to "taken". As with all predictions, this prediction was made some number of fetches earlier, the number being greater than 1 because of the delay in updating prediction history.

A number of examples will now be described to illustrate various technical aspects of the so-far described arrangement.

To simplify things, it is assumed that in the following example each fetched memory unit of data contains only 1 instruction. (This assumption is changed in some later examples.) Instructions are named in correspondence with their relative program address (i.e., "0:" refers to an initial program instruction, "1:" refers to a sequentially next program instruction, and so on).

Reference is made to FIG. 4, which is a processing sequence diagram 400 that illustrates a first set of exemplary pipelined processor operations, including maintenance of the branch prediction history, pred_hist, described above. The exemplary processor is the five-stage pipelined processor described in earlier examples. For each stage, the following information is shown:

The instruction number, along with other pertinent information such as whether the instruction is a branch (and if so, what the actual outcome of that branch will be), whether the instruction is in a last branch delay slot, and whether the instruction has been flushed The prediction history, pred_hist, that is associated with that instruction as it passes from stage to stage through the pipeline A branch prediction made by a predictor, using the instruction and its prediction history as a context.

Descriptive comments about the operations depicted in FIG. 4 are grouped according to execution cycle:

Cycle 1:

Instruction 0 is in the EXE stage and marks the end of branch delay slots (indicated with lower case "b") of a NT branch. (The branch instruction that corresponds to this "end of branch delay slots" has already exited the pipeline. The instruction in the EXE stage at this moment is not, itself, a branch instruction, which would have been represented by an uppercase "B".) This NT outcome has its effect on the history with a fixed delay of 2 units of data (in this example, 2 instructions) and therefor becomes visible in the history that was used to make a prediction for instruction 2 in ID1. (Note that a '0', representing a "not taken" predicted outcome, has been shifted into the left-most bit of pred_hist in the ID1 stage.) The reader is cautioned not to be under the impression that a delay of 2 units of data is equivalent to a delay of two stages in the pipeline. As will be seen later, flushed units of data are not counted in the delay calculation. Similarly, the reader is cautioned not to be under the impression that a delay of 2 units of data is in all examples equivalent to a delay of two instructions. In this particular example, in which each unit of data constitutes a single instruction, the equivalence can be made. However, in later examples, it will be seen that in some embodiments, units of data can each represent a plurality of instructions. However, even in such embodiments, the making of a prediction is represented in the prediction history two units of data later which, because each unit of data contains more than one instruction, may be a delay of more than two instructions.

Instruction 1 is in ID2 and (as an outside observer) we know that it is a branch instruction (indicated with a capital "B") that will not be taken (NT) when it is later evaluated in the EXE stage of the pipeline.

The end of the branch delay slots associated with the branch in ID2 is marked by instruction 3 presently located in the IF2 stage. (Because the number of branch delay slots is variable, it could alternatively have been in ID2, ID1, IF1, or even not yet fetched.) In this as well as in following embodiments, predictions are made available in the IF2 stage when the instruction loaded in that stage is predicted as being the end of a branch delay slot program segment. (Non-BDS-end instructions do not trigger branch prediction.) In this example it can be seen that a prediction is made because the instruction in the IF2 stage (instruction 3) is the end of a branch delay slot portion of the program. It can also be seen that the predicted branch outcome is "NT", which we as outside observers who created the example know will be correct. (The pipeline hardware does not yet know the actual outcome of the branch, since that branch is presently in ID2.) By default, instructions are fetched sequentially, so that the next instruction (instruction 4) has already been loaded into the IF1 stage. The prediction made in IF2 influences the pipeline operation in that the already fetched instruction is permitted to remain in the pipeline since it is the instruction that corresponds to a branch not taken condition. However, the effect of the NT prediction is not yet visible in the pipeline's predicted history (pred_hist) because its recordation will be applied with a delay of 2 units of data (in this case, equal to 2 instructions) and the second instruction has not yet been fetched. The NT prediction is maintained as meta-information that is attached to instruction 3 and is tracked through the pipeline as instruction 3 moves from one stage to the next.

Instruction 4 in IF1 is a branch instruction with 0 branch delay slots. This is indicated with the combination "Bb". As outside observers, we know that this branch instruction will eventually evaluate to Taken (T) and that its target address will be instruction 11. However, the pipeline hardware will not know this actual outcome until instruction 4 reaches the EXE stage.

Cycle 2

All instructions shift down by 1 place in the pipeline. Since, in the previous cycle, no program flow change was predicted nor was one required as a result of evaluation of a branch in the EXE stage, the sequentially next address (instruction 5) will be fetched in IF1. The history that is used to predict this instruction (00xx) now shows the effect of the prediction made for instruction 3 in Cycle 1. Note that there is a two unit of data delay again between instruction 3 and 5.

Instruction 4 reaches the IF2 stage and, because the branch prediction unit predicts this as being the end of a branch delay slot program segment, a prediction regarding branch direction and possibly also branch target are made there, using the history and context of instruction 4 as the basis for each of these predictions. (It is noted that instruction 4 is also a branch instruction—i.e., the size of the branch delay slot portion in this instance is zero—but its being a branch instruction does not trigger the branch prediction.) In this case the branch predictor correctly predicts not only that instruction 4 is a branch source, but also that the branch (represented by instruction 4) will be taken and that its target address will be 11. To stress one point: The fact that instruction 4 is not only the end of a branch delay slot program segment but is also itself a branch is not known by the branch predictor and is also not relevant to branch prediction. The predictor only tries to predict locations that mark the end of the branch delay slots of branch instructions.

Because the branch predictor predicts a taken (T) branch, the control flow will have to be retargeted to the predicted target address (11). Also, since branch prediction is made at the end of the branch delay slots of the branch, any sequentially fetched instruction immediately following the end of the branch delay slots, currently in IF1, will be from the NT control path and is therefore an incorrectly fetched instruction. At this point, triggered by the prediction of a taken branch, the IF1 stage is flushed (invalidated e.g., by suitably adjusting the state of a flag signal associated with each instruction in the pipeline, indicating whether or not that instruction is valid), so that the instruction will operate as a NOP. This cycle is now essentially lost, as the invalided instruction will flow through the pipeline, but will not have any effect on the state of the processor.

Instruction 1 reaches the EXE stage and the branch instruction is evaluated. With the outcome of the branch now known by the pipelined processor, the accuracy of the prediction that was made for its end of branch delay slots (instruction 3, currently in ID1) can now be evaluated. It turns out that this prediction was correct, so no further action is needed.

Cycle 3

All instructions are advanced one stage in the pipeline. Because of cycle 2's predicted "branch taken", the IF1 stage fetches the predicted branch target, which in this example is instruction 11. The prediction history that is associated with this instruction is (00xx). Note that this history includes the effect of the two predicted NT's based on the contexts of instructions 0 and 3 respectively. However, the meta-information representing instruction 11's predicted history does not include any representation of the predicted T at instruction 4 (i.e., the actual prediction that caused instruction 11 to be fetched). This is because the lost, invalidated position in the pipeline caused by a flush in cycle 2 does not count towards the 2 units of data delay between the end of the branch delay slots of a branch and its inclusion in the prediction history.

Unknown to the pipelined processor but, for pedagogical reasons known to us, the readers, is the fact that the newly fetched instruction 11 is a branch instruction (B) that will eventually evaluate to "Taken" with target "instruction 21".

Cycle 4

All instructions advance by 1 position in the pipeline. The unit of data representing instruction 12 is fetched and loaded into IF1. This is simply the sequentially next unit of data after instruction 11, since no control flow change was predicted in the previous cycle, nor was there a branch instruction whose evaluation required a control flow change. The meta-information representing the prediction history that is associated with instruction 12 now includes information representing the prediction made with respect to instruction 4 because instruction 12 is the second fetched unit of data after instruction 4 (the flushed instruction 5 is not counted in this computation).

Instruction 11 is in IF2, but no prediction is made, because instruction 11 is the branch instruction (B), and the branch predictor only detects (via prediction) the location of the end of the branch delay slots (denoted by lowercase "b").

Cycle 5

This cycle is very similar to cycle 2. A Taken prediction is made based on context information loaded in the IF2 stage, which causes a flush of IF1 (i.e., because IF1 contains the instruction that would have been fetched based on the branch not being taken). Also, a branch instruction (instruction 4) reaches the EXE stage, where it is evaluated and the outcome compared to the branch prediction at the end of its branch delay slots (i.e., the prediction made with respect to instruction 4, since this was a 0 delay slot branch). The prediction matches the evaluated outcome, so no further action is needed.

FIG. 5 is a processing sequence diagram 500 that illustrates the effect of an incorrect prediction on pipelined processor operations, including its effect on maintenance of the branch prediction history, pred_hist, described above. The same exemplary five-stage processor is used in this example and, for each stage, the same information is shown as in FIG. 4.

Descriptive comments about the operations depicted in FIG. 5 are grouped according to execution cycle:

Cycle 1

The processor predicts that instruction 3, presently in the IF2 stage, is the end of the branch delay slots of a branch instruction, and this prediction in turn triggers the prediction of branch direction and possibly also branch target. In this instance, the prediction is that the branch will not be taken (NT). Although the pipelined processor hardware does not yet know this, we as outside observers who created this example know that the corresponding branch instruction (instruction 1) is currently in ID2, and that it will subsequently be evaluated as a Taken branch. This means that the prediction made in IF2 during cycle 1 will turn out to be incorrect. However, in reliance on this incorrect prediction, instruction 4 (just loaded into IF1) will not be flushed during this cycle.

Cycle 2

The accuracy of the prediction made in cycle 1 is evaluated when the corresponding branch instruction (instruction 1) reaches the EXE stage. In this case, evaluation of the branch instruction at address 1 results in the branch being taken with the target being instruction 11. This actual branch result is compared with the predicted result (represented as "prediction" meta-information presently stored in the ID1 stage along with its corresponding instruction 3) and the pipeline thereby detects that the prediction for this branch was incorrect.

As a consequence of detecting the erroneous prediction, everything stored in the pipeline after the located end of branch delay slots (i.e., everything fetched subsequent to instruction 3) was fetched from an incorrect path (the NT path) and needs to be flushed from the pipeline. In this example the end of the branch delay slots is in the ID1 stage, so instructions 4 and 5 in respective stages IF1 and IF2 are flushed, but in general the location in the pipeline from where the flush occurs can be in any stage. To illustrate the consequence of the erroneous prediction, instructions 4 and 5 are shown as being flushed in cycle 2. It will be appreciated that, in the first part of cycle 2 prior up to detection of the erroneous prediction, these instructions were flagged as "valid"; the changing of their respective flags to "invalid"/"flushed" occurs mid-cycle.

It is important to note that all effects of the incorrect prediction on the history are removed from the pipeline as well. Specifically, instruction 5 includes meta-information representing the predicted history updated to include the erroneous NT prediction made with respect to instruction 3 in cycle 1. (Instruction 5's prediction history includes this extra '0' in the left-most (i.e., most significant) bit—the predicted history is '00xx'—because, in this instance, instruction 5 is the second fetched unit of data following instruction 3.) But, because that prediction was erroneous, instruction 5's prediction history is also incorrect. Accordingly, instruction 5's prediction history is also flushed from the pipeline.

Cycle 3

Branch evaluation of instruction 1 in cycle 2 resulted in the branch being taken, so fetching in cycle 3 continues with the correct target of the branch, which in this instance is instruction 11.

Note that the predicted history associated with instruction 11 is the correct history (0xxx), taking all delay effects of previous branches into account. More particularly, the prediction made with respect to instruction 3 should have been "Taken", which will result in a '1' being shifted into the left-most bit of the prediction history. However, since instructions 4 and 5 have been flushed from the pipeline, they are not counted when the pipeline computes the "fetched unit of data" distance from instruction 3. Therefore, instruction 11 is considered to be only the first fetched unit of data after instruction 3 and the '1' (indicating a taken branch) is not yet represented in the prediction history. Instruction 11's prediction history is therefore identical to the prediction history associated with instruction 3. It is apparent that determining exactly what the correct prediction history is for a fetched instruction can result in quite complicated hardware if, for example, a brute force search is implemented. Technology for efficiently determining what the correct history is when fetching is resumed after a flush caused by an erroneous prediction is discussed in greater detail below.

Cycle 4

Instruction 12 is fetched because it is the next sequential instruction after instruction 11 and no prediction or branch evaluation required a different action. Since instruction 12 is the second fetched unit of data following instruction 3 (the end of instruction 1's branch delay slots), the prediction history associated with instruction 12 now correctly includes the effect of the Taken branch at instruction 1. It is important to note that the prediction history cannot include information representing incorrect predictions (it must in those instances be updated to represent actual evaluation of the branch instruction) because having misinformation in the prediction history will degrade future prediction performance.

Cycle 5

Normal operation, with the flushed instruction 4 essentially acting as a NOP, so that the processor state is not changed. Instruction 12 is now in the IF2 stage of the pipeline, at which time the branch predictor output indicates (as a result of prediction) that the instruction is the last instruction in the branch delay slot program segment. Accordingly the branch predictor also supplies outputs indicating that the associated branch will be Taken, and that the branch target will be instruction 21. Although it is not shown in the Figure, in the next cycle (cycle 6) instruction 21 will be fetched and loaded into the IF1 stage as a result of the prediction made in cycle 5. Also, because the prediction is that a jump in control flow will be performed, instruction 13 (presently in IF1) is flushed.

Variable-Length Instructions

In the pipeline examples presented so far, every unit of data supplied by the program memory contains exactly one instruction. However many processors employ variable length instructions, meaning that each unit of data supplied at the output of the program memory can contain multiple instructions. This distinction is important when implementing a history delay mechanism since, for variable-length instructions, there is no longer a one-to-one correspondence between delay cycles and instructions. The delay cycles in these instances correspond to unit of data boundary crossings.

A predicted taken branch will cause the pipeline to fetch the unit of data containing the branch target as a new unit of data (the branch target need not be the first instruction in the newly fetched unit of data) and therefore will cause a unit of data boundary crossing. This is even the case when the branch jumps to itself. Because of this there is a difference when program flow continues after an incorrectly predicted taken branch versus continuation after an incorrectly predicted not taken branch.

Continuation after a taken branch implies continuation after a unit of data boundary crossing. Typically this is not true for a not taken branch and program flow will continue from the same unit of data except in instances in which the not taken branch source resides at the end of a unit of data, in which case program flow will continue from the next unit of data.

To illustrate these aspects, the next example assumes a pipelined processor architecture in which each unit of data fetched from program memory contains two consecutive instructions. As with the earlier examples, instructions are still named by their individual (byte) address. This example will illustrate why there is a need not only to maintain the above-described pred_hist, but also another version of branch history, which is herein referred to as "next_hist".

FIGS. 6a and 6b together constitute a processing sequence diagram 600-1 and 600-2 that illustrates the effect of an incorrect prediction on pipelined processor operations when each unit of data fetched from program memory can contain two instructions, including the effect of an incorrect prediction on maintenance of the branch prediction history, pred_hist, described above. The same exemplary five-stage processor is used in this example and, for each stage, the same information is shown as in FIGS. 4 and 5. Additionally, for each processing stage there is shown an additional branch history, next_hist.

Descriptive comments about the operations depicted in FIGS. 6a and 6b are grouped according to execution cycle. It will be observed that, because each fetch retrieves (potentially) two sequential instructions, each stage simultaneously processes two instructions (when two are present) during each cycle:

Cycle 1

At the beginning of this example, instructions 0 and 1 are in the EXE stage; instructions 2 and 3 are in the ID2 stage; instructions 4 and 5 are in the ID1 stage; instructions 6 and 7 are in the IF2 stage; and instructions 8 and 9 are in the IF1 stage. Instructions 8 and 9 are in the pipeline because the prediction made with respect to instruction 4 was that its corresponding branch (instruction 0) would be not taken.

The prediction corresponding to the branch at instruction 0 is in the EXE and is therefore evaluated. This allows the prediction made with respect to instruction 4 to be evaluated and confirmed to be correct.

An (incorrect) taken prediction is made for instruction 6 in IF2, causing a flush of all of the already-fetched next instructions (i.e., in this instance, instructions 7, 8 and 9).

Cycle 2:

The (incorrectly) predicted branch has caused the program flow to jump to a new unit of data that needed to be fetched from program memory (i.e., the unit of data that contains instruction 11). Counting from instruction 4 towards IF1, there are two different units of data in the pipeline (not counting units of data that contain only flushed instructions. Instruction 6 is in a different memory unit of data than instructions 4 and 5 (this is the first unit of data delay) and instruction 11 is in yet another unit of data (this is the second memory unit of data delay). This causes the effect on the history caused by the not taken branch at instruction 0 (with end of branch delay slots at instruction 4) to become visible in the history used to fetch the unit of data in IF1 (pred_hist=0xxx).

Cycle 3:

The not taken branch at instruction 5 is evaluated and turns out to have been incorrectly predicted as "taken" (the branch source for this branch is instruction 6). All instructions fetched after the end of the branch delay slots of this branch (i.e., instructions 7, 8, 9, 11, 12, and 13—there is no instruction 10) must be flushed from the pipeline.

The history that is to be used to fetch the next instruction for IF1 is rolled back (all incorrect speculative changes reverted) based on the history of the unit of data from which program flow will continue (i.e., history is reverted back starting with instruction 6's history). The prediction made with respect to the instruction where fetching will continue (instruction 7) is based on the same history as the other instruction (instruction 6) in the same unit of data. This history (xxxx) can be found in the pred_hist field associated with instruction 6. To find this pred_hist, the end of the branch delay slots must be tracked down in the pipeline where the history can then be retrieved. In some embodiments, the histories associated with the branch source instruction (in this example, instruction 6) are stored in, for example, registers (not shown) so that they can be made available as input to the branch predictor in cycle 4.

Continuing the example with FIG. 6b:

Cycle 4:

Fetching continues in cycle 4 with the corrected history (pred_hist=xxxx) determined in cycle 3 being associated with the newly fetched instruction 7.

Cycle 5:

Here we introduce an additional branch history that is maintained as metadata with each instruction as it passes through the pipeline: "next_hist". The next_hist field of instruction 6 (e.g., preserved in a register as described with respect to cycle 3) contains the history (0xxx) that represents instruction 4's "branch not taken" prediction (in cycle 3) that would have been used to fetch the unit of data that contains instructions 8 and 9 had instructions not been flushed from the pipeline. Note that if there had not been any incorrect predictions, the number of units of data from instruction 4 up to the unit of data containing instructions 8 and 9, would have been 2.

Note: the next_hist of one instruction is essentially the pred_hist of the instructions from the next memory unit of data. Or put another way, the next_hist reflects the effect of a branch instruction in the very next unit of data, without the two unit of data delay that exists with respect to the other branch history, pred_hist. It will be understood that this same information can be found by looking at a different location in the pipeline so from a technical point of view it is not necessary. But the conventional technology requires performance of two searches of the pipeline to re-create an accurate branch history after instructions have been flushed from the pipeline. By storing these two different values as metadata with each instruction in the pipeline, it is possible to avoid performing one of those searches. However, an additional feature to be described below completely eliminates the need to search through the pipeline altogether.

Cycle 6:

The effect on the history caused by the not taken branch at instruction 7 is now visible in IF1 (i.e., a '0' has now been shifted into pred_hist). From a branch history perspective it is as if the faulty prediction at instruction 6 had never been made.

It can be seen from the above example that the mechanism for retrieving the prediction history necessary to resume fetching after one or more instructions have been flushed from the pipeline is quite involved because the pipeline stage where the end of the branch delay slots resides must be found so that the branch history presently stored in that stage can be retrieved. Since their variable size means that the branch delay slots can end in any pipeline stage, there are as many potential sources for the needed branch history as there are pipeline stages. Implementing this "brute force search" solution requires large multiplexing networks, depending on the history size, that are potentially critical to timing.

In the following, technology is described whose performance is more efficient than a conventional, brute force search. One aspect of this technology involves making all necessary information available locally at the last stage of the pipeline (EXE). To do this, yet another kind of branch history, herein called "commit_hist", is introduced. The commit_hist is tracked by the last stage of the pipeline, and represents actual (as opposed to predicted) branch outcomes (e.g., taken or not taken) evaluated in that last stage. In the cycle in which it is produced, a branch outcome is supplied to the commit_hist storage mechanism (e.g., a register), so that the updated value of commit_hist is available in the very next cycle.

In order to facilitate a complete understanding of commit_hist, the processing sequence diagram of FIGS. 6a and 6b has been further annotated to depict the generation of commit_hist values for the given example. Looking first at cycle 1, commit_hist has a value that, for teaching purposes, is irrelevant. For this reason, it is depicted as 'xxxx' (i.e., each bit is a "don't care" value). Of note is the fact that the last stage of the pipeline (EXE) contains a branch instruction (instruction 0), and that this branch is evaluated to have a "not taken" outcome. Because each unit of data in this example can include two instructions, instruction 1 is also in the EXE during cycle 1, but it is not a branch instruction and so will not change the value of commit_hist.

The "not taken" outcome of instruction 0 is supplied to, for example, a commit_hist register which is clocked at the end of cycle 1. Consequently, the "not_taken" outcome in cycle 1 (represented by a binary '0') is reflected in commit_hist in the very next cycle, cycle 2 (i.e., commit_hist in cycle 2 is '0xxx').

In this example, none of the instructions 2, 3, and 4 is a branch instruction, so the value of commit_hist remains stable through cycles 2 and 3. In cycle 3, instruction 5 is a branch instruction whose outcome evaluates to "not taken". This branch outcome is supplied to the commit_hist storage mechanism at the end of cycle 3, so that the value of commit_hist in cycle 4 (see FIG. 6b) reflects this second "not taken" outcome (i.e., commit_hist in cycle 4 is now '00xx').

None of the remaining instructions passing through the last stage of the pipeline in cycles 4, 5, and 6 is a branch instruction, so the value of commit_hist remains stable at '00xx'. Although not shown in the figure, the value of commit_hist will also remain unchanged in cycle 7 because there was no branch evaluation in cycle 6.

With the two histories (pred_hist, next_hist) having arrived at the last stage of the pipeline, and with commit_hist being generated and maintained at the last stage of the pipeline, they are immediately accessible (i.e., the pipeline does not need to be searched to locate the values) and the last stage of the pipeline has all of the information it needs to correct the history data for the first stage of the pipeline whenever such correction is necessary.

One aspect of embodiments consistent with the invention involves arranging for the last stage of the pipeline (e.g., the EXE stage) to have available copies of all information required to determine the history for purposes of making a complete and accurate recovery of that history in the event of instructions being flushed from the pipeline. With this in place, the branch history can be recovered based entirely on information present in the last stage of the pipeline without having to perform any searches of other pipeline stages.

The size of the branch delay slots is encoded in the branch instruction (or equivalent information is encoded, making the size of the branch delay slots determinable). Accordingly, in another aspect of embodiments consistent with the invention, when a branch instruction reaches the last stage of the pipeline, its branch delay slots size is known (or can be ascertained). The prediction histories maintained by the pipeline are updated on boundaries between units of data. For example, suppose that a unit of data is large enough to represent four instructions in sequence. If the first of these instructions is in a last branch delay slot associated with an earlier branch, the prediction based on this instruction will not be reflected in any of the instructions filling the rest of the same unit of data. And, if one assumes a prediction delay of two cycles, as has been discussed in the examples set out above, the prediction will not be represented in the prediction history (pred_hist) until the second unit of data fetched after the present unit of data. The purpose of pointing this out is to emphasize that it is not the number of instructions, but rather the number of memory units of data, that plays an important part in the various embodiments consistent with the invention.

Accordingly, an aspect of the technology involves determining the number of unit of data boundary crossings that exist between the unit of data containing the branch instruction presently in the last stage of the pipeline and the unit of data containing the end of that branch instruction's branch delay slots. Since, by definition, there cannot be any branch instructions occupying any branch delay slots, all branches that can influence the history at the end of the branch delay slots have already reached the execution stage of the pipeline. Once it is known how many boundaries are crossed, the correct history (equal to the history at the end of the branch delay slots) can be picked from the histories available in the last stage of the pipeline. These histories are: pred_hist, next_hist and commit_hist.

A working embodiment illustrating these aspects in greater detail are described in the following. In this exemplary embodiment, for purposes of consistency with the earlier discussion, it is assumed that a branch prediction is not added to the branch history until the second memory unit of data following the unit of data containing the branch source has been fetched. Later in this description, the technology will be described in more general terms that do not restrict embodiments to this particular prediction delay value.

In an initial aspect, the distance (expressed in memory units of data) from the instruction in the last stage (EXE) of the pipeline to the end of its associated branch delay slots is determined. The instruction in the last stage is a branch instruction, and the address of the end of its associated branch delay slots is the branch source (i.e., the point from which program execution either continues with the next sequential instruction or jumps to a branch target location, depending on the outcome of branch evaluation). For the sake of example, if one assumes that the pipeline hardware utilizes an 8-bit addressing scheme, this distance can be determined by first determining:

$$\text{last\_byte\_of\_exe\_instr\_addr} = \text{exe\_instr\_addr} + \text{exe\_instr\_size} - 1 \qquad (1)$$

where:

last_byte_of_exe_instr_addr is the address of the last byte of the instruction presently in the last stage (EXE) of the pipeline;

exe_instr_addr is the address of the first byte of the instruction presently in the last stage (EXE) of the pipeline; and exe_instr_size is the size, in bytes, of the instruction presently in the last stage (EXE) of the pipeline.

Next, the address of the last byte of the instruction located in the last of the branch instruction's associated branch delay slots (represented by "end_of_bds_addr") is determined:

$$\text{end\_of\_bds\_addr} = \text{last\_byte\_of\_exe\_instr\_addr} + \text{branch\_delay\_slot\_size} \qquad (2)$$

where:

branch_delay_slot_size is the size (e.g., in bytes) of the branch delay slots associated with the branch instruction. It will be observed that a value of zero means that there are no branch delay slots.

Now "last_byte_of_exe_instr_addr" points to the last byte of the instruction in the execution stage of the pipeline (EXE) and "end_of_bds_addr" points to the last byte of the last instruction of the branch delay slots.

In order to restore the correct prediction history following a branch misprediction, and again assuming exemplary embodiments in which the prediction delay is 2 cycles, it is necessary to determine the histories with which to predict the two memory units of data that are to be (correctly) fetched following the branch delay slots associated with the branch presently in the last stage of the pipeline. The point at which program flow should continue will be either the byte after the end_of_bds_addr (in the case of the branch being not taken) or the target of the branch (in the case of the branch being taken). The location of the prediction histories for the 2 memory units of data starting from this point depends on the number of memory unit of data crossings between the last byte of the branch instruction in the last stage of the pipeline and the point at which program flow should continue after the misprediction.

To ascertain this number, the technology must, in one aspect, account for the number of memory unit of data boundary crossings caused by fetching the instructions in the branch delay slots. One way of determining this number is by discarding the lower bits of both addresses ("last_byte_of_exe_instruction_addr" and of "end_of_bds_addr") and computing the difference, with the number of lower bits discarded being the number that leaves the granularity of the addresses exactly equal to a memory unit of data.

Expressing these granularity adjusted addresses as last_byte_of_exe_instruction_addr$_{ADJ}$ and of end_of_bds_addr$_{ADJ}$ respectively, the hardware can then determine the distance, Dist, as:

$$\text{Dist} = \text{end\_of\_bds\_addr}_{ADJ} - \text{last\_byte\_of\_exe\_instruction\_addr}_{ADJ} \qquad (3)$$

The difference between these two resulting addresses is the distance in memory units of data from the last byte of the branch instruction in EXE to the end of its branch delay slots, and this distance also represents the number of memory unit of data boundary crossings encountered between those two addresses.

When a branch instruction is not taken and that branch instruction's last branch delay slot does not end at the last byte of a memory unit of data, the calculated distance, Dist, is the number of memory unit of data boundaries that are crossed between the branch instruction in the last stage of the pipeline and the memory unit of data containing the next instruction to be executed following that branch instruction's branch delay slots. This is because, in such instances, the next sequential instruction following the branch delay slots is in the same memory unit of data as the last byte of the branch delay slots.

However, in other instances, 1 more memory unit of data boundary will be encountered between the end_of_bds_addr and the point at which program flow will continue after the branch. This can be the case when either of the following occurs:

1. The branch is not taken, but the end_of_bds_addr is located at the last byte of a memory unit of data. In this case, the next instruction will begin at the start of the next memory unit of data even though it is the next address in sequence (i.e., even though its address is end_of_bds_addr+1). In this instance, a distance correction is made by incrementing the ascertained distance: Dist=Dist+1.

OR

2. The branch in the last stage of the pipeline is taken. In this case, the next instruction will begin somewhere in a newly fetched memory unit of data, and this is counted as 1 additional memory unit of data boundary. In this instance, a distance correction is made by incrementing the ascertained distance: Dist=Dist+1.

Accordingly, an aspect of some embodiments consistent with the invention involves detecting instances in which the branch is not taken but the end_of_bds_addr is located at the last byte of a memory unit of data or in which the branch in the last stage of the pipeline is taken, and in those instances incrementing the calculated distance by 1.

Figure 7A:
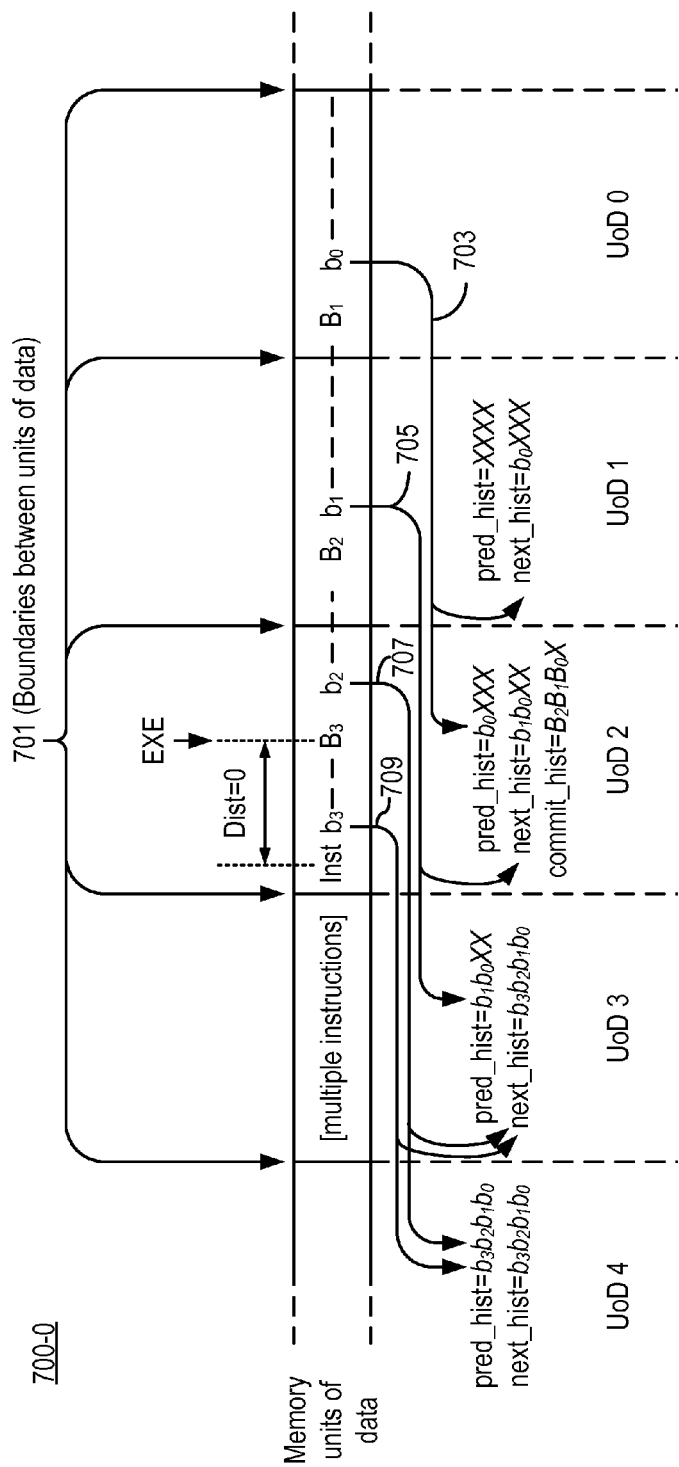
FIGS. 7a, 7b, and 7c illustrate the relationship between a calculated distance and a recovered branch prediction history in embodiments that are characterized by having a 2-unit of data delay between the unit of data containing a branch source and the unit of data at which a branch prediction based on that branch source is made available to the branch predictor.
Figure 7B:
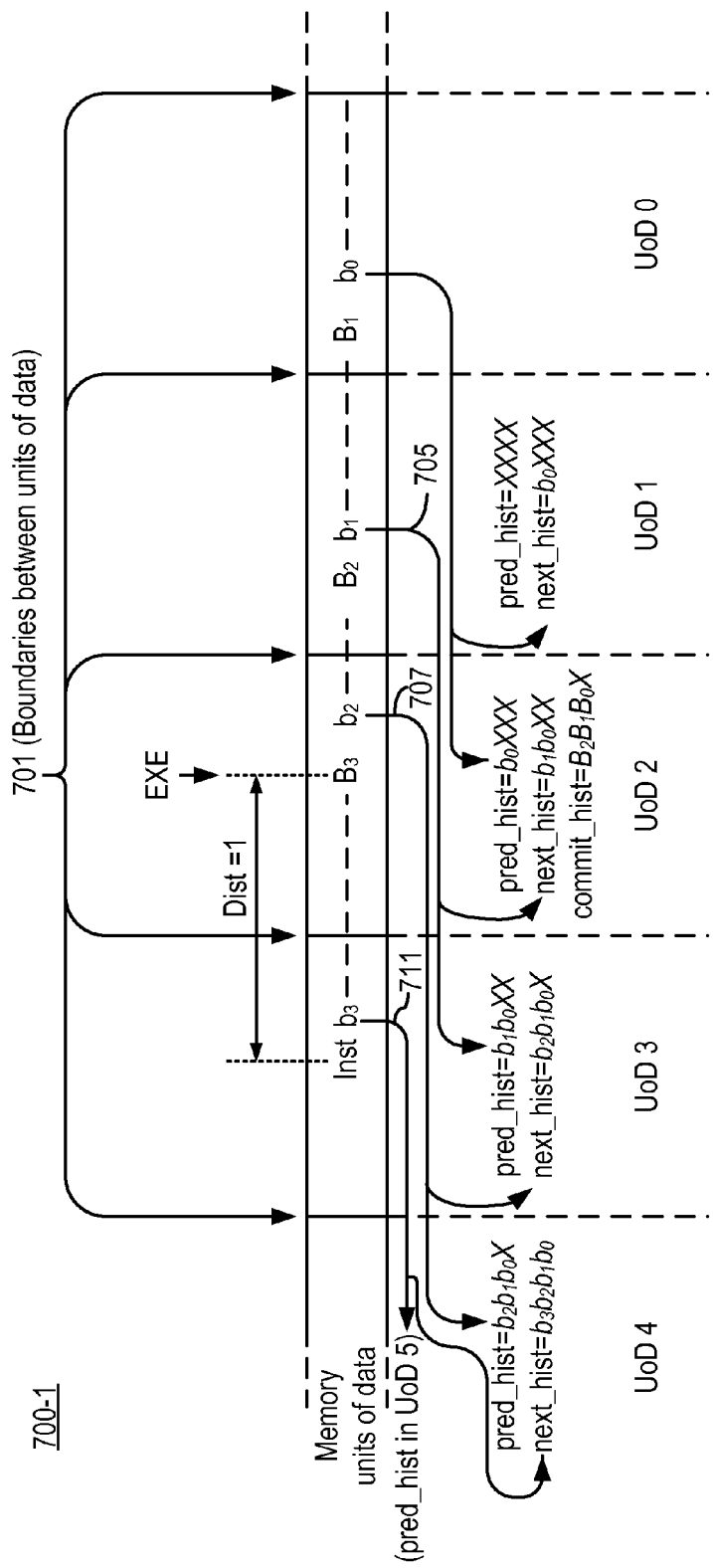
Figure 7C:
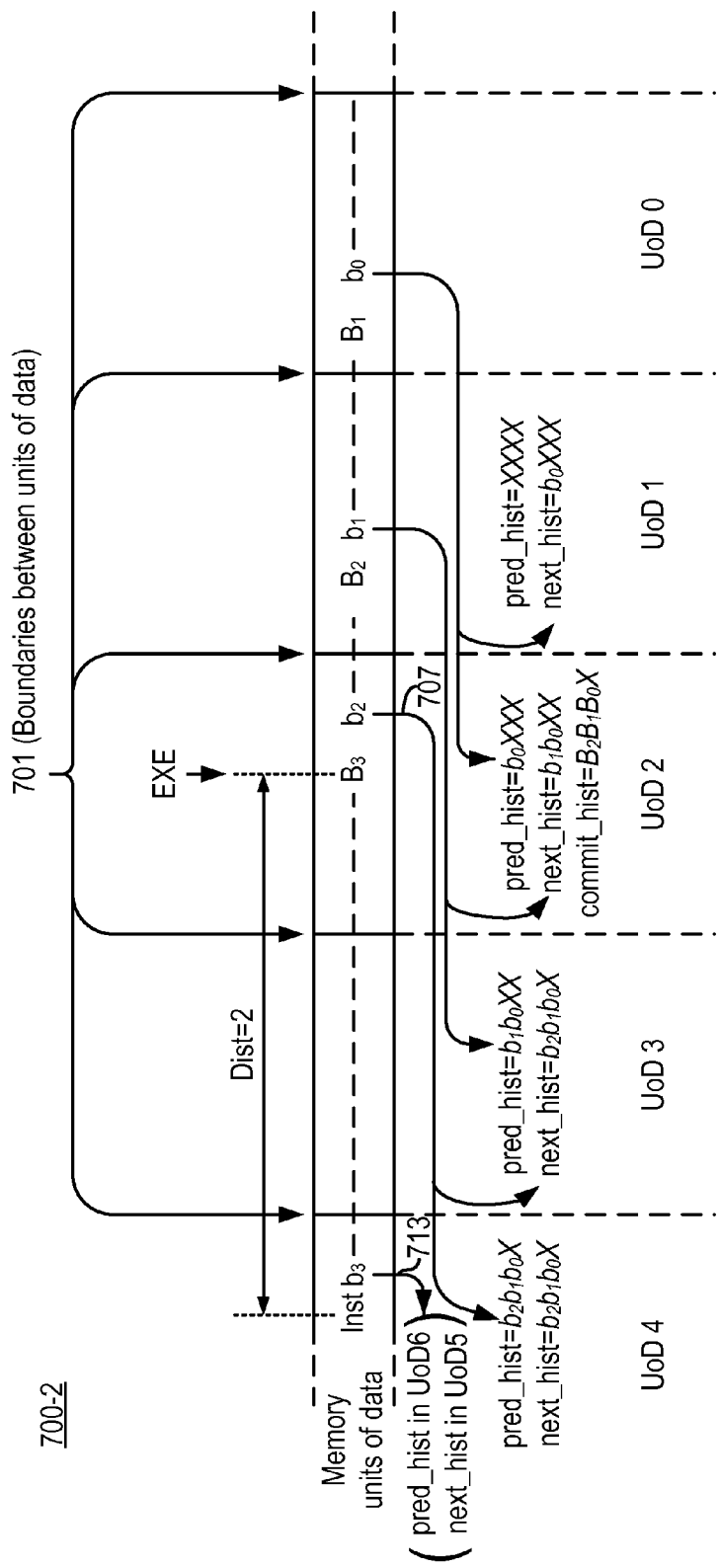

Knowing the distance between the branch instruction in the last stage of the pipeline and the memory unit of data containing the next instruction to be executed following the last instruction in the branch delay slots enables the technology to identify what values the prediction histories associated with the instruction following the last instruction in the branch delay slots should have. FIGS. 7a, 7b, and 7c illustrate the relationship between this calculated distance and the recovered branch prediction history in embodiments that are characterized by having a 2-unit of data delay between the branch prediction unit's making a prediction and the application of that prediction outcome to the maintained prediction history. The recovered pred_hist value is the value that must be used to continue branch prediction in the first stage of the pipeline (e.g., IF1).

It is important to understand that FIGS. 7a, 7b, and 7c do not depict the pipeline; they are illustrations of the dynamic corrected instruction flow, separated by memory unit of data ("UoD") boundaries 701 and the histories (pred_hist, next_hist) that should hold for these memory units of data. A depiction of the pipeline would differ at least in that it would generally include flushed instructions which may or may not include entirely flushed memory units of data. A pipeline depiction would also be able to illustrate the passage of time measured in terms of numbers of cycles. However, because the number of flushed instructions in any given instance is variable, whereas the number of UoD boundaries is constant in all instances, these figures show the passage of units of data, rather than time. All that is assumed with respect to the pipeline is that branch instruction $B_3$ is in the last stage of the pipeline (EXE). The rest of the pipeline may or may not contain additional instructions after $B_3$. Each of the FIGS. 7a, 7b, and 7c shows boundaries 701 between memory units of data, and each memory unit of data is identified as "UoD n", where n is an integer.

FIGS. 7a, 7b, and 7c also show branch history values referred to above as "pred_hist" and "next_hist" being associated with each memory unit of data. The last stage (EXE) of the pipeline also has the third branch history, commit_hist, described above. It will be observed that, for each memory unit of data, the value of next_hist for a given unit of data n is equal to the value of pred_hist for UoD n+1. That is, wherein a branch prediction does not show up in pred_hist until two UoDs after the prediction has been made, that same branch prediction shows up in next_hist only one UoD after the prediction has been made. This might at first glance appear to violate the restriction that, due to the 2-cycle prediction delay, a prediction cannot be added to the prediction history until two cycles after the prediction has been made available. This seeming violation disappears, however, when one recognizes that these figures do not depict cycles; they depict memory units of data. Unlike the value of pred_hist, which must be made available to the IF1 stage two cycles after the prediction has been made available so that it can be used to start the prediction based on the instruction loaded into IF1, the value of next_hist only needs to be associated with a given memory unit of data by the time that unit of data reaches the last stage of the pipeline (i.e., for purposes of branch history recovery in the event of a misprediction). Accordingly, when a prediction is made available at the end of one cycle, it can be added to the value of pred_hist associated with the unit of data fetched and loaded into the first stage (IF1) of the pipeline in the next cycle, and can simultaneously be added to the value of next_hist associated with the unit of data that has been shifted into the second stage (IF2) of the pipeline.

As to the value of commit_hist, as explained earlier, it is based on the outcome of actual branch evaluation in the last stage of the pipeline. Therefore, it is clocked into a commit_hist storage mechanism (e.g., a register) at the end of the present cycle and is available in the very next cycle. Since, unlike the other branch histories (pred_hist and next_hist) this value is not communicated through the pipeline from one cycle to the next, it is not strictly speaking associated with a memory unit of data. Instead, its value can be thought of as being associated with the last stage of the pipeline. It represents the history of all branches that have become part of the architectural (committed) state of the processor.

The nomenclature introduced earlier, in which a lowercase "b" represents a branch source (defined as the last slot of a branch instruction's associated branch delay slots), and an uppercase "B" represents a branch instruction, is used here as well. In order to be able to represent prediction values generically (i.e., without indicating whether the prediction is "taken" or "not taken") and also to be able to identify the branch source that served as the basis for the prediction, such predictions will be represented by an italicized lowercase "b". Similarly, in order to be able to represent branch evaluations generically (i.e., without indicating whether a particular evaluation resulted in "taken" or "not taken"), and also to be able to identify the particular branch instruction whose evaluation is being represented, such evaluations will be represented by an italicized uppercase "B".

FIG. 7a depicts an instance 700-0 in which the distance between an executed branch instruction ($B_3$) in UoD 2 and the instruction (Inst) following the branch instruction's last branch delay slot ($b_3$) is calculated to be zero. In this example, UoD 0 includes a last branch delay slot instruction, $b_0$, (i.e., the branch source for the branch $B_0$) followed (with possibly intervening instructions—not shown) by a branch instruction, $B_1$. The arrow 703 shows that, because of the two-UoD prediction history delay, the prediction associated with instruction $b_0$ is not introduced into the predicted history, pred_hist, until UoD 2 (shown as pred_hist=$b_0$XXX), and into the herein-called "next history" until UoD 1.

This example also shows that UoD 1 includes a last branch delay slot ($b_1$), which is the branch source associated with branch $B_1$. This is followed (with possibly intervening instructions—not shown) by a branch instruction, $B_2$. The arrow 705 shows that, because of the two-UoD prediction history delay, the prediction associated with instruction $b_1$ is not introduced into the predicted history, pred_hist, until UoD 3 (shown as pred_hist=$b_1 b_0$XX) and into the next history, next_hist, until UoD 2.

UoD 2 includes a last branch delay slot ($b_2$), which is the branch source associated with branch $B_2$. This is followed (with possibly intervening instructions—not shown) by a branch instruction, $B_3$, and this in turn is followed (with possibly intervening instructions—not shown) by a last branch delay slot ($b_3$), which is the branch source for $B_3$. The arrows 707 and 709 show that, because of the two-UoD prediction history delay, the predictions associated with instructions $b_2$ and $b_3$, respectively, are not introduced into the predicted history, pred_hist, until UoD 4 (shown as pred_hist=$b_3 b_2 b_1 b_0$), and because of the one-UoD delay, these predictions are not introduced into the next_hist until UoD 3.

Since UoD2 contains a branch instruction, $B_3$, that is presently in the last stage (EXE) of the pipeline (indicated in the figure by the EXE pointing to the position of $B_3$), it is worthwhile illustrating the value of commit_hist at this point. As mentioned earlier, the value of commit_hist is derived from the outcome of actual branch evaluation. The branch outcome value is clocked into the commit_hist storage mechanism upon completion of the cycle in which the branch instruction is evaluated. Since, in this example, the branch instruction, $B_3$, is only in the process of being evaluated, its outcome is not yet known, the value of commit_hist=$B_2B_1B_0$ X, which reflects the outcomes of only previously evaluated branches.

FIG. 7b depicts an instance 700-1 in which the distance between an executed branch instruction ($B_3$) in UoD 2 and the instruction (Inst) following the branch instruction's last branch delay slot ($b_3$) is calculated to be one (i.e., one memory unit of data boundary is crossed between those two memory locations. The descriptions of UoD 0 and UoD 1 as well as their effect on the values of pred_hist associated with UoD 2 and UoD 3, respectively, and their effect on the values of next_hist associated with UoD1 and UoD 2, respectively, are the same as those set forth above with respect to FIG. 7a, and therefore need not be repeated. The same is true with respect to the value of commit_hist: As with the example of FIG. 7a, commit_hist is clocked at the end of a cycle in which a branch is evaluated in the last stage of the pipeline. At the moment in time captured in this example, the branch instruction $B_3$ in UoD2 is only in the process of being evaluated, so its outcome is not yet known. Consequently, the value of commit_hist=$B_2B_1B_0$ X, which reflects the outcomes of only previously evaluated branches.

UoD 2 includes a last branch delay slot ($b_2$), which is the branch source associated with branch $B_2$. This is followed (with possibly intervening instructions—not shown) by a branch instruction, $B_3$ The arrow 707 shows that, because of the two-UoD prediction history delay, the prediction associated with instruction $b_2$ is not introduced into the prediction history, pred_hist, until UoD 4 (shown as pred_hist=$b_2b_1b_0$ X), and because of the one-UoD delay, this prediction is not introduced into the next_hist until UoD 3 (shown as next_hist=$b_2b_1b_0$ X).

This example differs from that of FIG. 7a in that the branch source associated with branch $B_3$ (i.e., the instruction $b_3$) is included in UoD 3 rather than UoD 2. Further, since UoD 3 also includes a following instruction, Inst, the calculated distance (i.e., the number of memory unit of data boundary crossings) from the branch, $B_3$, to the instruction, Inst, is equal to one. The arrow 711 shows that, because of the two-UoD prediction history delay, the prediction associated with instruction $b_3$ is not introduced into the prediction history, pred_hist, until UoD 5 (not shown) and because of the one-UoD delay, this prediction is not introduced into the next_hist until UoD 4 (shown as next_hist=$b_3b_2b_1b_0$).

FIG. 7c depicts an instance 700-2 in which the distance between an executed branch instruction ($B_3$) in UoD 2 and the instruction (Inst) following the branch instruction's last branch delay slot ($b_3$) is calculated to be two. The descriptions of UoD 0 and UoD 1 as well as their effect on the values of pred_hist associated with UoD 2 and UoD 3, respectively, and their effect on the values of next_hist associated with UoD1 and UoD 2, respectively, are the same as those set forth above with respect to FIG. 7a, and therefore need not be repeated. The same is true with respect to the value of commit_hist: As with the example of FIG. 7a, commit_hist is clocked at the end of a cycle in which a branch is evaluated in the last stage of the pipeline. At the moment in time captured in this example, the branch instruction $B_3$ in UoD2 is only in the process of being evaluated, so its outcome is not yet known. Consequently, the value of commit_hist=$B_2B_1B_0$ X, which reflects the outcomes of only previously evaluated branches.

As with the example of FIG. 7b, UoD 2 shown in FIG. 7c includes a last branch delay slot ($b_2$), which is the branch source associated with branch $B_2$. This is followed (with possibly intervening instructions—not shown) by a branch instruction, $B_3$ The arrow 707 shows that, because of the two-UoD prediction history delay, the prediction associated with instruction $b_2$ is not introduced into the prediction history, pred_hist, until UoD 4 (shown as pred_hist=$b_2b_1b_0$ X), and because of the one-UoD delay, this prediction is not introduced into the next_hist until UoD 3 (shown as next_hist=$b_2b_1b_0$ X).

In this example, there are no predictions made with respect to instructions in UoD 3. The branch source ($b_3$) for the third branch instruction, $B_3$, is included in UoD 4. As indicated by the arrow 713, the prediction made with respect to this end of branch delay slots instruction will be reflected in the pred_hist associated with UoD 6 (not shown), and will be reflected in the next_hist associated with UoD 5 (not shown).

The branch source instruction $b_3$ is followed in UoD 4 by another instruction (Inst). Consequently, the calculated distance (i.e., the number of memory unit of data boundary crossings) from the branch, $B_3$, to the instruction, Inst, is equal to two.

A study of the examples shown in FIGS. 7a, 7b, and 7c makes it clear that the distance, expressed in memory units of data, between the branch in the last stage (EXE) of the pipeline and the instruction following the branch's end of branch delay slots is a factor in determining which histories should be associated with the unit of data immediately following the end of the branch delay slots. Since the histories pred_hist and next_hist are carried through the pipeline with their associated memory unit of data, and since the value of commit_hist is generated from all branches that have passed through the last stage of the pipeline, the last stage of the pipeline has ready access to any history information that is necessary to recover a correct history after a misprediction. In particular, the values of what are herein referred to as "recovery histories" (in this embodiment, corresponding to pred_hist and next_hist) to be used for the next memory unit of data following the branch source (end of branch delay slots) can be expressed in terms of the values that are available in the last stage of the pipeline. For convenience, these readily available values are referred to herein as EXE.pred_hist, EXE.next_hist and EXE.commit_hist. (The qualifier "EXE" denotes that these are the values that are readily available to the last stage of the pipeline.)

It is also observed that the distance can always be statically determined (using subtraction) and does not depend in any way on the layout of the pipeline, the number of pipeline bubbles, how many stalls or flushes there have been, or any other dynamic behavior of the pipeline.

In this embodiment, there are two recovery histories, denoted recov_hist(0) and recov_hist(1) (in correspondence with the two maintained histories pred_hist and next_hist) whose values are needed for branch registration or history repair following the end of the BDSs. In general, the number of recovery histories will correspond to the number, N, of histories maintained in the set of branch prediction histories 809, 811. In the exemplary embodiment, determining the values of the recovery histories involves differentiating between 3 cases, depending on the distance ("Dist") calculated in the manner described above (including possible adjustment when the branch is not taken but the end_of bds_addr is located at the last byte of a memory unit of data or when the branch in the last stage of the pipeline is taken). The three cases, and the steps performed for assigning values to recov_hist(0) and recov_hist(1) are as follows:

1. Distance=0:
recov_hist(0)=EXE.pred_hist
recov_hist(1)=EXE.next_hist
2. Distance=1:
recov_hist(0)=EXE.next_hist
recov_hist(1)=EXE.commit_hist
3. Distance ≥2:
recov_hist(0)=EXE.commit_hist
recov_hist(1)=EXE.commit_hist Notice that when EXE.commit_hist is used, its value is the value just prior to the updated value that reflects the outcome of the branch currently in EXE.

The following discussion lays out in further detail how these histories are used for fetching when the speculative history needs to be repaired after a flush of the pipeline.

With the values of recov_hist(0) and recov_hist(1) being derived from histories that arrive through the pipeline along with their associated memory unit of data, and with the value of commit_hist being generated and maintained in connection with the last stage of the pipeline, the last stage has all the information needed to restore the speculative history after a misprediction. The goal is to restore the information in such a way that the Instruction Fetch Unit will use the correct prediction histories to continue fetching, just as if the misprediction had never occurred. Depending on the direction of the branch where the misprediction occurred, the information is restored in different ways. This is because in case of a taken branch, the first fetch after the misprediction is the target of the branch, which is a newly fetched memory unit of data, whereas a repair after a not taken branch can involve re-fetching the memory unit of data where the misprediction occurred. This difference in fetching either a new memory unit of data or a repeat of the memory unit of data where the misprediction occurred is the reason for the difference in repair actions.

There is yet another wrinkle in the analysis of how a restoration of speculative branch history needs to be carried out, and this relates to the relative position of the branch source (i.e., the end of a branch instruction's branch delay slots) within a memory unit of data. More particularly, when the last byte of a branch source of a mispredicted not taken branch (i.e., a not taken branch whose associated prediction wrongly indicated that it would be "taken") is followed by another instruction within the same memory unit of data, the first memory unit of data that is fetched after the repair is the same memory unit of data that contains the branch source, as mentioned above.

However, when the last byte of a branch source of a mispredicted not taken branch (i.e., a not taken branch whose associated prediction wrongly indicated that it would be "taken") occupies the very last position within a memory unit of data, the first memory unit of data that is fetched after the repair is not the same memory unit of data upon with word where the misprediction occurred, but is instead the sequentially next memory unit of data. Since this is a new memory unit of data, it is similar to the case in which repair involves fetching the target of a taken branch. Accordingly, a mispredicted not taken branch whose branch source resides at the end of a memory unit of data should be repaired in the same way that a mispredicted taken branch is repaired. As described earlier, to account for this, some but not necessarily all embodiments include detecting instances in which the branch source of a mispredicted not taken branch occupies the very last position within a memory unit of data, and in those detected instances incrementing the calculated distance by 1.

Handling the several cases is described in the following:

1. Branch is not Taken (but Mispredicted as "Taken"), with Last Byte of Branch Source not being at End of Memory Unit of Data After a not taken branch, the first fetch will be a repeat of the memory unit of data where the misprediction occurred so that remaining instructions following the branch source in that memory unit of data can be executed. The first time this memory unit of data was fetched, its address was supplied to the branch prediction unit along with the value of recov_hist(0) (or equivalently, pred_hist) for the purpose of predicting whether this memory unit of data is an end of branch delay slots (and if so, the branch direction of the associated branch and possibly also the target address), so that is what it should be used again. In this respect it is important to understand that when program flow continues after a "branch not taken" that had been mispredicted as "taken" and the last byte of the branch source is not equal to an end of memory unit of data, predictions must be made for subsequent "ends of branch delay slots" that may be present in that memory unit of data, and in order to make this prediction, the history used to perform the earlier misprediction for this memory unit of data must be used again. Note that, as mentioned earlier, if the not taken branch source happens to be at the very end of a memory unit of data, there is no need to re-fetch this memory unit of data because there are no further instructions that have yet to be executed within the unit of data. For this reason, this special case is handled like a mispredicted taken branch.

The second fetch after the misprediction will be the next sequential memory unit of data and it should be predicted with recov_hist(1).

Analysis shows that commit_hist has been updated for all branches up to and including the misprediction (but not for any branches situated after the not taken branch). This makes commit_hist the history that should be updated with the first new prediction after the misprediction.

2. (a) Branch is Taken (but Mispredicted as "not Taken") OR (b) Branch is not Taken (but Mispredicted as "Taken") and Last Byte of Branch Source is at End of Memory Unit of Data After a taken branch, the first fetch will be the target of that branch. Or, in the case of a not taken branch with branch source at the end of a memory unit of data, the first fetch will be the next sequential unit of data following the branch source. Since the target is the first memory unit of data after the memory unit of data where the misprediction occurred, it should be predicted with recov_hist(0), keeping in mind that the values of recov_hist(x) are determined based on an adjusted (incremented) value of computed Distance.

The second fetch after the misprediction will be the next sequential memory unit of data after the branch target and its address should be predicted with recov_hist(1), keeping in mind that the values of recov_hist(x) are determined based on an adjusted (incremented) value of computed Distance. Because the branch is taken, recov_hist(1) (whose value has been set to EXE.commit_hist) is fully updated for all branches up to and including the memory unit of data where the misprediction occurred, which makes commit_hist the 2 memory unit of data delayed version of the history that is needed for the next sequential memory unit of data after the branch target.

Analysis shows that commit_hist has been updated for all branches up to and including the misprediction, so it is the history that should be updated with the new predictions after the misprediction The examples presented so far relate to embodiments in which the predictor requires two cycles to produce a prediction based on supplied prediction history and a present instruction context (e.g., a branch source instruction). To accommodate this delay, a strategy has been employed in which a prediction made with respect to a given memory unit of data first makes an appearance in the prediction history associated with a memory unit of data that is two units after the given memory unit of data that served as the source of the prediction. However, this is not an essential aspect of embodiments consistent with the invention. To the contrary, the principles that have been taught in the various working embodiments described up to this point can be applied in other embodiments, in which the delay (measured in terms of memory units of data) between a memory unit of data that serves as the basis of a prediction and the memory unit of data whose associated prediction history first reflects the prediction is other than two memory units of data.

Figure 8:
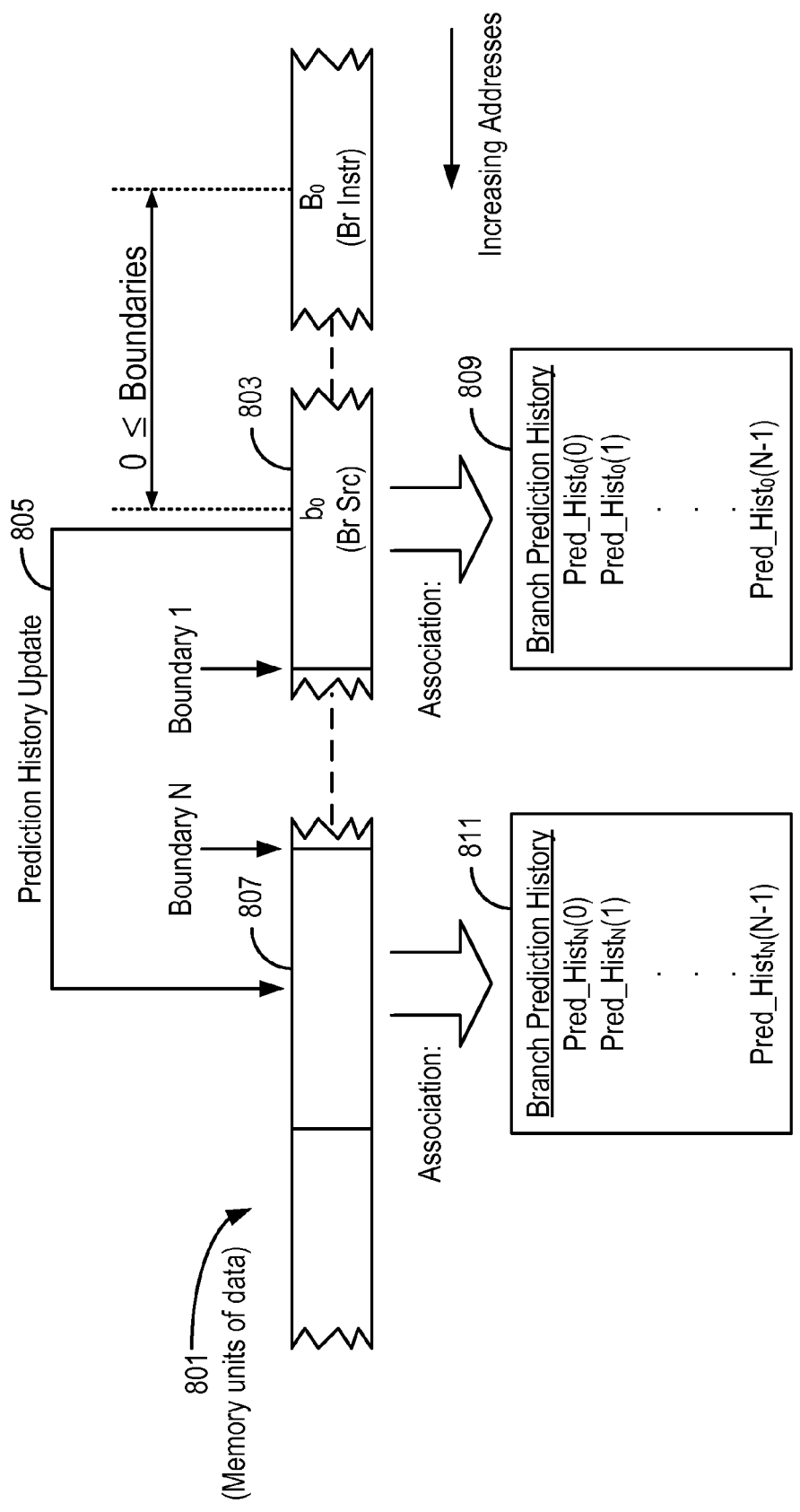
FIG. 8 is a diagram showing a relationship between a plurality of memory units of data and their associated branch prediction histories.

To illustrate this point, FIG. 8 is a diagram of a plurality of memory units of data 801 whose addresses increase from right to left as shown in the figure. Consider an exemplary one of these, the unit of data 803. As with FIGS. 7a, 7b, and 7c, it is important to understand that FIG. 8 does not depict the pipeline; it illustrates a dynamic instruction flow, separated by memory unit of data boundaries.

In this example, the unit of data 803 includes a branch source, denoted $b_0$. Consistent with the earlier examples, the branch source is associated with a branch instruction, denoted $B_0$, and is located in a last branch delay slot of the associated branch instruction $B_0$. Because the size of the branch delay slots is variable and can range from any value greater than or equal to zero, the number of memory unit of data boundaries between the branch instruction, $B_0$, and the branch source instruction, $b_0$, can also be greater than or equal to zero.

Also consistent with earlier described embodiments, branch predictions are made with respect to branch source instructions. In the general case, one can consider embodiments that employ a branch predictor that requires N cycles from the time prediction starts until it is made available at the output of the predictor, where N is greater than or equal to one. Embodiments can then be designed such that prediction history is updated in the $N^{th}$ memory unit of data following the one that served as the basis for the prediction. This is illustrated in FIG. 8 by the prediction history update 805 associated with the branch source instruction $b_0$ (located in memory unit of data 803) being applied with respect to a memory unit of data 807 that is the $N^{th}$ unit of data following the memory unit of data 803. This means, and as shown in the figure, that there are N unit of data boundaries between the memory unit of data 803 and the memory unit of data 807.

As with earlier described embodiments, each memory unit of data is associated with a branch prediction history that is carried along with the memory unit of data as metadata as the memory unit of data progresses through the pipeline. Keeping in mind that the goal is to enable the last stage of the pipeline to have ready access to all of the branch prediction histories that could potentially be required to repair the branch prediction histories of memory units of data that are fetched as part of recovery from a detected branch misprediction, each memory unit of data has associated with it a set of N branch prediction histories. The N histories correspond to each memory unit of data maintaining the branch prediction history that was used to predict the memory unit of data itself as well as the sequentially next N-1 branch prediction histories that were used to generate addresses for the N-1 memory units of data that were fetched between the memory unit of data and the $N^{th}$ next memory unit of data to which a present prediction update will be applied.

To facilitate a better understanding of this concept, consider the memory unit of data 803. As mentioned earlier, a branch prediction based on this memory unit of data will be applied to update the branch prediction history of the memory unit of data 807, which is the $N^{th}$ memory unit of data following the memory unit of data 803. Accordingly, the memory unit of data 803 is associated with a set of branch prediction histories 809. The set of branch prediction histories 809 comprises N branch prediction histories, denoted $Pred\_Hist_0(0)$, $Pred\_Hist_0(1)$, ..., $Pred\_Hist_0(N-1)$. The subscript "0" is used herein to denote that the set of branch prediction histories is associated with a particular memory unit of data.

Consistent with earlier embodiments, the value of $Pred\_Hist_0(0)$ is the branch prediction history that was used to generate the address for fetching the memory unit of data 803. This is equivalent to be branch prediction history denoted "pred_hist" in the earlier described embodiments.

The value of $Pred\_Hist_0(1)$ is the branch prediction history that was used to generate the address for fetching the very next memory unit of data following the memory unit of data 803. This is equivalent to be branch prediction history denoted "next_hist" in the earlier described embodiments.

In embodiments in which N=2, there is no need for additional prediction histories as this is exactly the class of embodiments described with reference to earlier figures. (It will be recalled that the third described history, namely "commit_hist", is not a prediction history but is instead a history of actual branch evaluation outcomes and is generated and maintained in the last stage of the pipeline; it is not a value that is carried through the pipeline with a memory unit of data.)

However, in the general case, it is necessary to associate each memory unit of data with its own prediction history as well as the N-1 prediction histories that are used to predict the next N-1 memory units of data.

To reinforce the understanding that each memory unit of data is associated with its own set of branch prediction histories, FIG. 8 also shows that the memory unit of data 807 is associated with a set of branch prediction histories 811 whose values ($Pred\_Hist_N(0)$, $Pred\_Hist_N(1)$, ..., $Pred\_Hist_N(N-1)$) represent the prediction history used to predict the address of memory unit of data 807 and the subsequent N-1 memory units of data. It will be understood that FIG. 8 depicts only the association between branch prediction histories and memory units of data. However, because FIG. 8 does not represent the pipeline, the timing of branch prediction history creation is not shown. In this respect, it should be understood that the N prediction histories associated with any given memory unit of data become available during the N cycles following the moment that the unit of data enters the pipeline until a prediction concerning that unit of data (e.g., whether it is branch source, if so the predicted branch direction, if taken the target address) is made for it.

When it is necessary to repair sets of branch prediction histories following a misprediction, the technology uses the same procedures as described earlier to calculate the distance (numbers of boundary crossings) between the branch instruction associated with the misprediction and the instruction following the branch instruction's end of branch delay slots. Using the examples of FIGS. 7a, 7b, and 7c as a guide (along with the teachings set out with respect to earlier figures), the person of ordinary skill in the art will readily understand the principles to be applied in any given embodiment when it is necessary to determine values of BDS_Pred_Hist$_n$(0), BDS_Pred_Hist$_n$(1), . . . , Pred_Hist$_n$(N−1) based on the calculated distance and the values of the set of branch prediction histories as well as commit_hist presently available in the last stage of the pipeline. (When N=2, the values of BDS_Pred_Hist$_n$(0) and BDS_Pred_Hist$_n$(1) are the values of BDS_pred_hist and BDS_next_hist, described earlier).

Figure 9A:
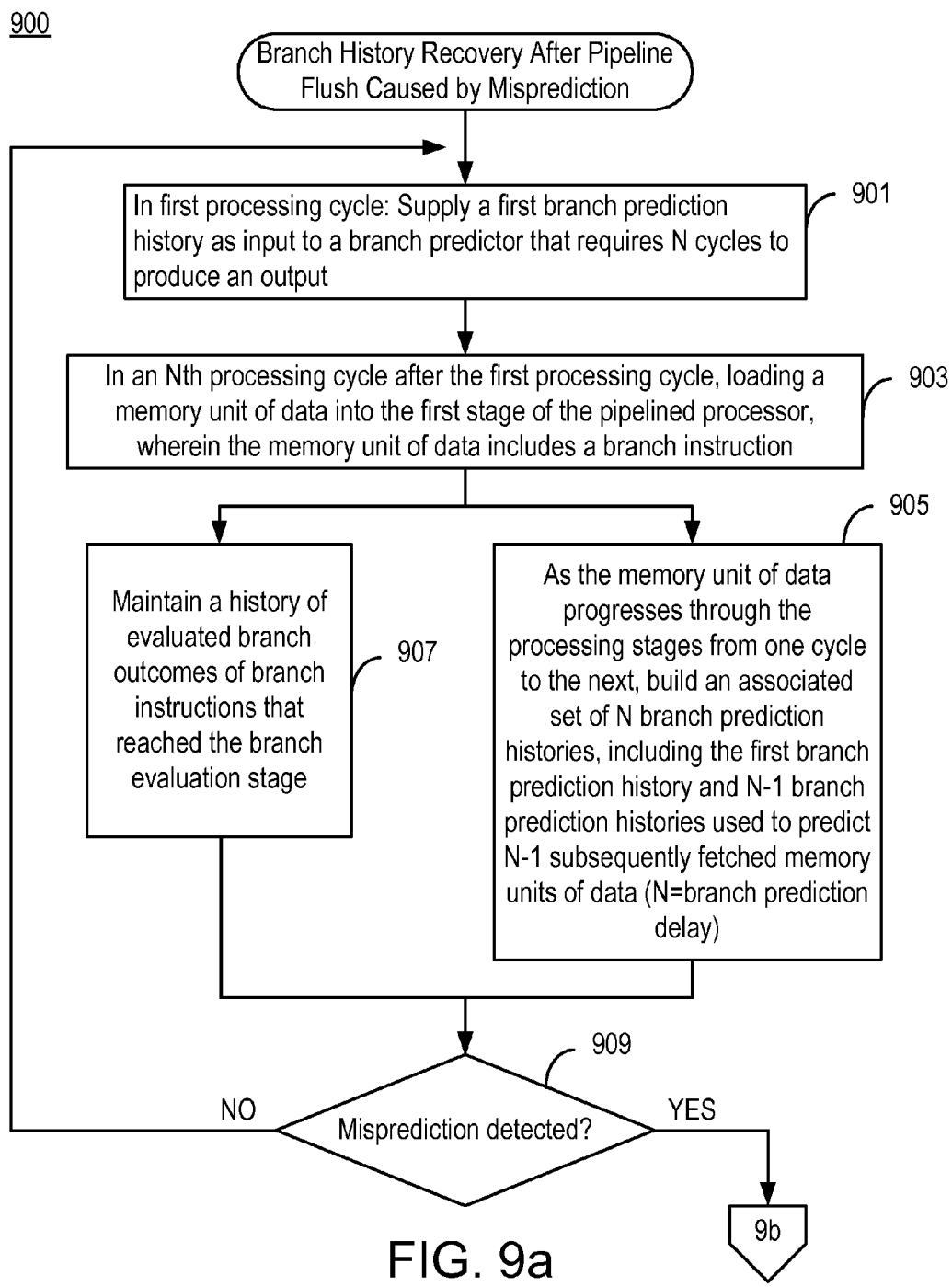

To further illustrate aspects of embodiments consistent with the invention, FIGS. 9a and 9b together are, in one respect, a flow chart of steps/processes performed by circuitry in accordance with some but not necessarily all exemplary embodiments of the invention for the purpose of recovering instructions and branch histories in a pipelined processor after a pipeline flush caused by branch misprediction. In another respect, FIGS. 9a and 9b together can be considered to depict exemplary means 900, 950 comprising the various illustrated circuitry (e.g., hard-wired and/or suitably programmed processor) configured to perform the described functions.

The environment in which the steps are carried out is a pipelined processor having a plurality of serially connected processing stages including a first stage and a branch evaluation stage. In the above-described embodiments, the last stage of the pipeline has been the branch evaluation stage. However, it is recognized that alternative embodiments can be devised in which this is not the case. For this reason, in the following description, which is intended to describe aspects generically, the term "branch evaluation stage" is used.

It is also assumed that one of the processing stages other than the branch evaluation stage is a prediction start stage that supplies information for making branch predictions. Also, the pipelined processor is operatively coupled to a memory that comprises a plurality of addressable storage locations, each storage location being for storing one unit of data.

Consistent with the above-described embodiments, the pipelined processor executes instructions from an instruction set that includes a branch instruction and each branch instruction is associated with a set of branch delay slots whose size can be greater than or equal to zero and whose size can be different from one instance of a branch instruction to another, and in which the last one of the branch delay slots is a branch source of the associated branch instruction.

Given this context, operation of the pipeline includes, in a first processing cycle, supplying a first branch prediction history as input to a branch predictor that requires N cycles to produce an output (step 901). Then, in an $N^{th}$ processing cycle after the first processing cycle, a memory unit of data is loaded into the first stage of the pipelined processor (step 903). In general, the memory unit of data can include any type(s) of instruction(s). However, to facilitate an understanding of certain aspects of embodiments consistent with the invention, the description will focus on instances in which the memory unit of data includes a branch instruction. Consistent with the description of the environment, the branch instruction is associated with a set of branch delay slots whose number can be greater than or equal to zero. The last one of the branch delay slots serves as the branch source of the branch instruction. Note: In instances in which the number of branch delay slots is zero, the branch instruction is, itself, the branch source of the branch instructions. But since the number of branch slots can vary from one instance of a branch instruction to another, this is not generally the case.

The reader is also informed that some aspects of pipeline operation have been simplified to avoid cluttering the description with details that are not critical to attaining an understanding of the various aspects of embodiments consistent with the invention. However, it is worth pointing out that, in some embodiments, fetching a memory unit of data can actually take place over a plurality of cycles. The illustrated stages during which a fetch is "in flight" are named as such. For example, in the embodiments illustrated herein, a fetch can be considered to be in flight during the cycles associated with the IF1 and IF2 stages, at the end of which the data becomes available from the memory and can be clocked into the next stage (ID1) where its decoding can start. In such embodiments, during IF1 and IF2, no data from the program memory is yet available. Consequently, those stages deal only with "meta" information, such as the memory address from which the memory unit of data is being fetched, and also the value of pred_hist with which a prediction for the corresponding (in flight) memory unit of data is being made. Therefore, it will be understood that the term "loading" is used broadly to encompass all such types of embodiments (i.e., those in which the memory unit of data is clocked into a first processing stage, and others in which it is "in flight" over a number of cycles.

As the memory unit of data progresses through the processing stages from one cycle to a next, a set of N branch prediction histories that are associated with the memory unit of data is built, wherein the N branch prediction histories comprise the first branch prediction history and N−1 branch prediction histories used to predict N−1 subsequently fetched memory units of data (step 905). The value of N is equal to the number of cycles the branch predictor requires to generate each predicted address. For example, in the above-described embodiments, N=2, but this need not be the case in all embodiments.

Additionally, a history of evaluated branch outcomes of branch instructions that reached the branch evaluation stage is maintained (e.g., in the branch evaluation stage of the pipeline) (step 907). For ease of illustration, this is shown as being in parallel with step 905. However, in practice this is performed in parallel with all earlier steps.

When the branch instruction reaches the evaluation stage, the technology detects whether a branch misprediction has occurred (decision block 909). Detection is based on a present evaluation of the branch instruction included in the memory unit of data and an earlier predicted outcome. If no misprediction has occurred ("NO" path out of decision block 909), processing continues as described (schematically represented by the return to the start of the flowchart, although due to the inherent parallelism of a pipelined processor, the various illustrated steps take place at the same time as one another, although with respect to different instructions and memory units of data).

If a branch misprediction is detected ("YES" path out of decision block 909, and continuing on FIG. 9b), then values of each one of N recovery histories are selected from the history of evaluated branch outcomes and the set of branch prediction histories (step 911). Respective ones of the N selected recovery histories are then supplied as input to the branch predictor when each one of N next memory units of data are loaded into the prediction start stage of the pipeline (step 913).

Looking at step 911 in greater detail, in some embodiments this comprises (also shown in FIG. 9b), computing a distance that represents how many memory unit of data boundaries exist between the branch instruction and the branch source of the branch instruction (step 915).

Then, values are selected from the evaluated branch outcomes and the set of branch prediction histories associated with the memory unit of data as a function of a set of parameters (step 917). As described in the working examples presented above, the set of parameters comprises the computed distance. Another parameter can be whether the branch source of the branch instruction is a last instruction in the memory unit of data. Also, as described earlier, another parameter can be whether the branch outcome evaluates to "taken".

Figure 10:
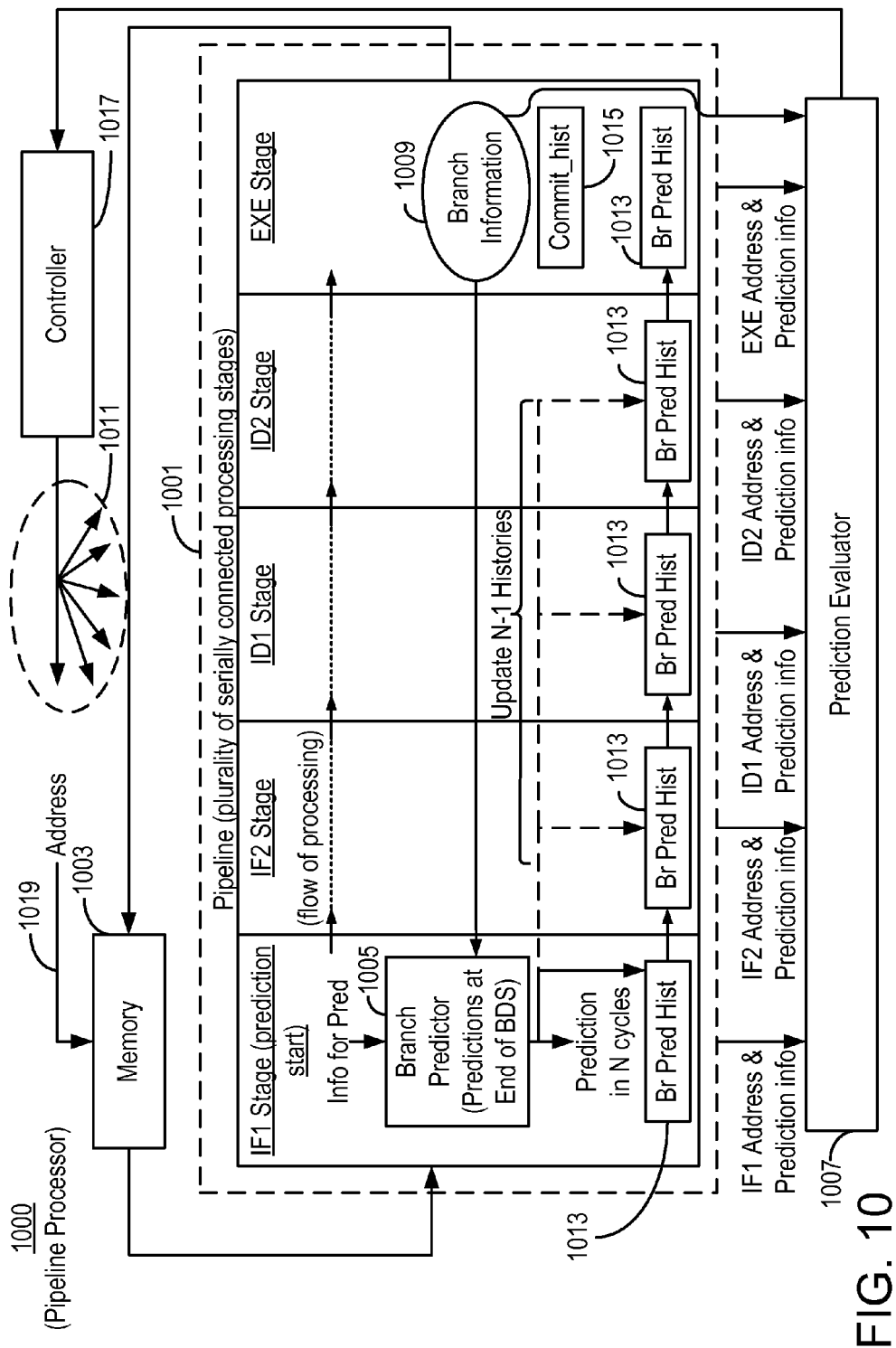
FIG. 10 is a block diagram of a pipelined processor in accordance with embodiments that are consistent with the invention.

FIG. 10 is a block diagram of a pipelined processor 1000 in accordance with embodiments that are consistent with the invention. In particular, the pipelined processor 1000 is configured to carry out processing in accordance with any of the earlier-described embodiments, such as the methodology described with respect to FIGS. 9a and 9b. The pipelined processor 1000 includes a pipeline 1001 that is made up of a plurality of serially connected processing stages. In this example, there are five stages (IF1, IF2, ID1, ID2, and EXE), but the principles disclosed here are equally applicable to pipelines having a different number of processing stages (i.e., more or fewer than five).

Instructions for the pipeline are fetched from a memory 1003 and supplied to a first stage of the pipeline 1001, which in this example is the IF1 stage. As explained in greater detail earlier, the processing stages of the pipeline 1001 operate concurrently, each based on its own instruction (and possibly also data). Only the last stage of the pipeline 1001 (in this example, the EXE stage) is capable of changing the committed state of the pipelined processor 1000. To facilitate this aspect of processing, the last stage of the pipeline (e.g., EXE stage) can supply data to a data input port of the memory 1003.

The pipelined processor 1000 also includes a branch predictor 1005 that produces an output indicating whether an instruction is a branch source, and if so what the evaluated branch direction is predicted to be, and if a "branch taken" condition is predicted then what the branch target is predicted to be. If a prediction is "not a branch source", then the pipelined processor 1000 simply continues fetching a next memory unit of data from the sequentially next address. The prediction algorithm used by the branch predictor 1005 can be instantiated by means of any known predictor algorithm, such as and without limitation, technology disclosed by Scott McFarling, "Combining Branch Predictors", WRL Technical Note TN-36, June 1993, pp. 1-25, Digital Western Research Laboratory, Palo Alto, Calif., USA. In the illustrated embodiment, the branch predictor 1005 bases its prediction on information (e.g., branch history, addresses, etc.) made available in the first stage (e.g., IF1) of the pipeline 1001. However, branch prediction takes time. In exemplary embodiments described above, the branch predictor requires 2 cycles before a branch prediction is made available at the output of the branch predictor 1005. In such embodiments, the branch predictor is itself pipelined and can be considered to run in parallel with (or be part of) the IF1 and IF2 stages, with address and history information being supplied to the branch predictor input in IF1, and output (e.g., prediction information) being made available at the end of the IF2 stage. However, in the general case, this is considered to be N cycles, as described above with respect to FIGS. 9a and 9b. For this reason, the branch predictor 1005 is illustrated as a block that receives its input in the IF1 stage, and that makes the corresponding prediction output available after N cycles.

Because of its relationship with the branch predictor 1005, the first stage (e.g., IF1) is, in this embodiment, the designated "prediction start stage" (i.e., this is the stage in which information for making predictions is first supplied to the branch predictor which, in general, takes N cycles to produce an output from that input information). However, this aspect can be different in alternative embodiments. As just one of many possible examples, the predictor may instead be associated with the second processing stage (e.g., IF2 stage) of the pipeline 1001, in which case the second stage would be the prediction start stage. To facilitate the description, the term "prediction start stage" is herein used to refer to whichever one of the processing stages is associated with the branch predictor 1005 and supplies information that is used by the branch predictor 1005 to make a prediction.

The branch predictor 1005 of embodiments consistent with the invention starts making branch outcome predictions (e.g., direction, target) when it has concluded that an instruction presently loaded in the prediction start stage of the pipeline 1001 is in the last slot of a variable branch delay slot portion of a program. This is the branch source of an associated branch instruction. It will be observed that, since embodiments consistent with the invention permit branch instances in which the size of the branch delay slot portion is zero, it can sometimes be the case that a branch prediction will start to be made when a branch instruction is in the prediction start stage of the pipeline 1001. However, since the size of a branch delay slot portion is variable, meaning that it can vary from one branch instance to another, it is generally the case that any type of instruction may occupy the prediction start stage at the time that a branch prediction is made, and that the associated branch instruction will already have occupied and then been shifted out of the prediction start stage.

The pipelined processor also includes a prediction evaluator 1007 which detects when an earlier made prediction was wrong (i.e., when a misprediction occurred). As explained earlier, a wrong prediction requires that one or more instructions that were fetched as a result of the misprediction will have to be flushed from the stages of the pipeline 1001 that they are presently occupying, and fetching will have to start with the correct target instruction.

Detection of a prediction error is based partly on branch information 1009 that is produced from actual evaluation of the branch instruction. The evaluated branch outcome information 1009 is typically produced in the last stage of the pipeline 1001 (e.g., in the EXE stage), but in alternative embodiments the branch information 1009 can be generated in other stages. For this reason, the stage in which the branch information 1009 is produced is herein referred to as a "branch evaluation stage". It will be recognized that, in the exemplary embodiment of FIG. 10, the last stage of the pipeline 1001 is also the branch evaluation stage of the pipeline 1001. However, the term "branch evaluation stage" is intended to be broader, covering any stage that produces this information.

In one aspect, whereas the information for making a prediction by a conventional predictor is available in the same pipeline stage in which the branch resides, the information for making predictions by the branch predictor 1005 is stored with the instruction at the end of the branch delay slots. This means that instead of performing a direct evaluation of prediction accuracy in the branch evaluation stage of the pipeline 1001 (e.g., the EXE stage), if the end of the branch delay slots has been loaded into the pipeline by the time the branch has reached the EXE stage (in some instances, this may not be the case), the end of the branch delay slots must be found in the pipeline when the branch has reached the EXE stage. Information broadcast by the branch evaluation stage makes it possible for every other stage to independently decide whether or not it contains the end of the branch delay slots associated with the evaluated branch.

Since embodiments consistent with the invention allow the size of the branch delay slot portion to vary from instance to instance, this involves searching through the pipeline to find the stage in which the end of the branch delay slots is at the time when the branch instruction is in the branch evaluation stage of the pipeline 1001. The prediction evaluator 1007 performs this search activity, and for this purpose receives, for example, address and prediction information from each of the pipeline stages.

With respect to the prediction evaluator's search activity, the branch instruction includes means for locating the last BDS instruction, such as an offset field encoded in each branch instruction, from which the address of the end of the branch delay slots can be calculated. The addresses of each stage are then compared to the calculated address of the end of the branch delay slots. The prediction information of the pipeline stage for which the address matches the end of branch delay slots address is evaluated by means of the branch information 1009 from EXE. If the branch was predicted incorrectly, the instructions in the pipeline stages that were wrongly fetched after the end of the branch delay slots are flushed, and new instructions are fetched starting with the target instruction identified by evaluation of the branch instruction.

In alternative embodiments, prediction evaluation can be a distributed process in which evaluated branch outcomes are broadcast to every pipeline stage, and every pipeline stage independently checks whether that stage contains a prediction for the evaluated branch (i.e., whether that stage presently holds the branch source for the evaluated branch instruction). Any stage finding that it holds the branch source then detects whether it contains an incorrect prediction for the evaluated branch. If an incorrect prediction is detected, the stage triggers a flush of all previous stages in the pipeline. This type of embodiment helps avoid timing issues similar to those that would be encountered trying to recover pred_hist from each pipeline stage during a pipeline recovery.

In this exemplary embodiment, each pipeline processing stage includes branch history storage 1013 (e.g., a set of registers, shift registers, etc.) for building and maintaining the branch prediction history associated with each memory unit of data as that memory unit of data progresses from one stage of the pipeline to the next. The branch history storage 1013 should be suitable for storing branch histories such as the branch prediction histories 809 and 811 shown in FIG. 8. The particular size of the branch history in any given embodiment is a function of the number of cycles, N, that the branch predictor requires to produce each branch prediction.

It is noted that, since the number of entries that need to be supplied to a branch history storage 1013 in order to build a complete branch prediction history depends on the number of cycles, N, that the branch predictor 1005 requires to generate a branch prediction, and since predictions are produced, at most, one per cycle, FIG. 10 shows dashed lines connecting the output of the branch predictor 1005 to the branch history storage 1013 of later stages in the pipeline.

The last stage of the pipeline 1001 (e.g., EXE stage) also includes commit_hist storage 1015 (e.g., register, shift register, etc.) that receives and maintains a history of evaluated branch outcomes.

It will be appreciated from the figure that the last stage (EXE) of the pipeline 1001 has ready access to both the commit_hist and the branch prediction history, so there is no need to search through the pipeline when this information is required to recover after a misprediction.

The above-described and other aspects of the pipelined processor 1000 are, in this exemplary embodiment, controlled by control signals 1011 generated by a controller 1017. For example, the controller 1017 ensures that the correct address 1019 (e.g., next sequential address or predicted address or evaluated branch address) is supplied to the memory 1003. The controller 1017 is further adapted to carry out the methodology described above in the various working embodiments and in the more general cases described with reference to FIGS. 9*a* and 9*b*. The controller's operation is based on state information such as, for example, any one or combination of information representing the results of prediction evaluation, information generated by the branch predictor 1005 (e.g., whether a prediction has been generated during a present cycle), and values supplied by the commit_hist storage 1015 and branch history storage 1013 located in the last stage (EXE) of the pipeline 1001.

In alternative embodiments, the use of a central controller 1017 is avoided by distributing control over the various pipeline stages. Such distributed control is, like the above-described embodiment, adapted to carry out the methodology described above in the various working embodiments and in the more general cases described with reference to FIGS. 9*a* and 9*b*.

The various embodiments achieve improved performance over conventional technology. Such improvements include, but are not limited to:
 elimination of a large multiplexing network that would otherwise be needed to locate and route suitable branch prediction history information from the stages of the pipeline to misprediction recovery hardware
 improved timing of the pipeline resulting from avoidance of a large multiplexing network The invention has been described with reference to particular embodiments. However, it will be readily apparent to those skilled in the art that it is possible to embody the invention in specific forms other than those of the embodiment described above. Accordingly, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of controlling a pipelined processor having a plurality of serially connected processing stages including a first stage and a branch evaluation stage, wherein one of the processing stages other than the branch evaluation stage is a prediction start stage that supplies information for making branch predictions, wherein the pipelined processor is operatively coupled to a memory that comprises a plurality of addressable storage locations, each storage location being for storing one unit of data, wherein the pipelined processor executes instructions from an instruction set that includes a branch instruction and each branch instruction is associated with a set of branch delay slots whose size can be greater than or equal to zero and whose size can be different from one instance of a branch instruction to another, the method comprising:
    in a first processing cycle, supplying a first branch prediction history as input to a branch predictor that requires N cycles to produce an output;
    in an $N^{th}$ processing cycle after the first processing cycle, loading a memory unit of data into the first stage of the pipelined processor, wherein the memory unit of data includes a branch instruction;
    as the memory unit of data progresses through the processing stages from one cycle to a next, building a set of N branch prediction histories that are associated with the memory unit of data, wherein the N branch prediction histories comprise the first branch prediction history and N−1 branch prediction histories used to predict N−1 subsequently fetched memory units of data;
    maintaining a history of evaluated branch outcomes of branch instructions that reached the branch evaluation stage;
    detecting, based on a present evaluation of the branch instruction included in the memory unit of data and an earlier predicted outcome, whether a branch misprediction occurred; and
    in response to a detection that the branch misprediction occurred:
        selecting values of each one of N recovery histories from the history of evaluated branch outcomes and the set of branch prediction histories; and
        supplying respective ones of the N selected recovery histories as input to the branch predictor when each one of N next memory units of data are loaded into the prediction start stage of the pipeline,
    wherein a last one of the branch delay slots is a branch source of the associated branch instruction.

2. The method of claim 1, wherein selecting values of each one of the N recovery histories from the history of evaluated branch outcomes and the set of branch prediction histories comprises:
    computing a distance that represents how many memory unit of data boundaries exist between the branch instruction and the branch source of the branch instruction; and
    selecting values of the N recovery histories from the history of evaluated branch outcomes and the set of branch prediction histories that are associated with the memory unit of data as a function of a set of parameters, wherein the set of parameters comprises the computed distance.

3. The method of claim 2, wherein the set of parameters comprises a detection of whether the branch source of the branch instruction is a last instruction in the memory unit of data.

4. The method of claim 2, wherein the set of parameters comprises a detection of whether the present evaluation of the branch instruction is a branch taken outcome.

5. The method of claim 1, wherein N equals 2.

6. An apparatus for controlling a pipelined processor having a plurality of serially connected processing stages including a first stage and a branch evaluation stage, wherein one of the processing stages other than the branch evaluation stage is a prediction start stage that supplies information for making branch predictions, wherein the pipelined processor is operatively coupled to a memory that comprises a plurality of addressable storage locations, each storage location being for storing one unit of data, wherein the pipelined processor executes instructions from an instruction set that includes a branch instruction and each branch instruction is associated with a set of branch delay slots whose size can be greater than or equal to zero and whose size can be different from one instance of a branch instruction to another, the apparatus comprising:
    a controller configured to cause the pipelined processor to perform:
        in a first processing cycle, supplying a first branch prediction history as input to a branch predictor that requires N cycles to produce an output;
        in an $N^{th}$ processing cycle after the first processing cycle, loading a memory unit of data into the first stage of the pipelined processor, wherein the memory unit of data includes a branch instruction;
        as the memory unit of data progresses through the processing stages from one cycle to a next, building a set of N branch prediction histories that are associated with the memory unit of data, wherein the N branch prediction histories comprise the first branch prediction history and N−1 branch prediction histories used to predict N−1 subsequently fetched memory units of data;
        maintaining a history of evaluated branch outcomes of branch instructions that reached the branch evaluation stage;
        detecting, based on a present evaluation of the branch instruction included in the memory unit of data and an earlier predicted outcome, whether a branch misprediction occurred; and
        in response to a detection that the branch misprediction occurred:
            selecting values of each one of N recovery histories from the history of evaluated branch outcomes and the set of branch prediction histories; and
            supplying respective ones of the N selected recovery histories as input to the branch predictor when each one of N next memory units of data are loaded into the prediction start stage of the pipeline,
    wherein a last one of the branch delay slots is a branch source of the associated branch instruction.

7. The apparatus of claim 6, wherein selecting values of each one of the N recovery histories from the history of evaluated branch outcomes and the set of branch prediction histories comprises:
    computing a distance that represents how many memory unit of data boundaries exist between the branch instruction and the branch source of the branch instruction; and
    selecting values of the N recovery histories from the history of evaluated branch outcomes and the set of branch prediction histories that are associated with the memory unit of data as a function of a set of parameters, wherein the set of parameters comprises the computed distance.

8. The apparatus of claim 7, wherein the set of parameters comprises a detection of whether the branch source of the branch instruction is a last instruction in the memory unit of data.

9. The apparatus of claim 7, wherein the set of parameters comprises a detection of whether the present evaluation of the branch instruction is a branch taken outcome.

10. The apparatus of claim 6, wherein N equals 2.

11. A pipelined processor comprising:

a plurality of serially connected processing stages including a first stage and a branch evaluation stage, wherein one of the processing stages other than the branch evaluation stage is a prediction start stage that supplies information for making branch predictions, wherein the pipelined processor executes instructions from an instruction set that includes a branch instruction and each branch instruction is associated with a set of branch delay slots whose size can be greater than or equal to zero and whose size can be different from one instance of a branch instruction to another, wherein a last one of the branch delay slots is a branch source of the associated branch instruction;

a memory that comprises a plurality of addressable storage locations, each storage location being for storing one unit of data, wherein the pipelined processor is operatively coupled to the memory; and a controller configured to cause the pipelined processor to perform:

in a first processing cycle, supplying a first branch prediction history as input to a branch predictor that requires N cycles to produce an output;

in an $N^{th}$ processing cycle after the first processing cycle, loading a memory unit of data into the first stage of the pipelined processor, wherein the memory unit of data includes a branch instruction;

as the memory unit of data progresses through the processing stages from one cycle to a next, building a set of N branch prediction histories that are associated with the memory unit of data, wherein the N branch prediction histories comprise the first branch prediction history and N−1 branch prediction histories used to predict N−1 subsequently fetched memory units of data;

maintaining a history of evaluated branch outcomes of branch instructions that reached the branch evaluation stage;

detecting, based on a present evaluation of the branch instruction included in the memory unit of data and an earlier predicted outcome, whether a branch misprediction occurred; and in response to a detection that the branch misprediction occurred:

selecting values of each one of N recovery histories from the history of evaluated branch outcomes and the set of branch prediction histories; and supplying respective ones of the N selected recovery histories as input to the branch predictor when each one of N next memory units of data are loaded into the prediction start stage of the pipeline.

* * * * *